United States Patent
Bilhaut et al.

(10) Patent No.: US 8,536,962 B2
(45) Date of Patent: Sep. 17, 2013

(54) BISTABLE MAGNETIC NANOSWITCH

(75) Inventors: Lise Bilhaut, Grenoble (FR); Philippe Andreucci, Moirans (FR); Laurent Duraffourg, Voiron (FR); Bernard Viala, Sassenage (FR)

(73) Assignee: Commissariat a l'Energie Atomique, Paris (FR)

( * ) Notice: Subject to any disclaimer, the term of this patent is extended or adjusted under 35 U.S.C. 154(b) by 534 days.

(21) Appl. No.: 12/412,843

(22) Filed: Mar. 27, 2009

(65) Prior Publication Data

US 2009/0243772 A1    Oct. 1, 2009

(30) Foreign Application Priority Data

Mar. 28, 2008   (FR) ...................... 08 52061

(51) Int. Cl.
*H01H 51/22*    (2006.01)
(52) U.S. Cl.
USPC ............................ 335/78; 200/181
(58) Field of Classification Search
USPC ............................ 335/78; 200/181
See application file for complete search history.

(56) References Cited

U.S. PATENT DOCUMENTS

| | | | |
|---|---|---|---|
| 6,593,731 B1 | 7/2003 | Roukes et al. | |
| 2002/0153583 A1 | 10/2002 | Frazier et al. | |
| 2006/0114086 A1* | 6/2006 | Grigorov | 335/151 |
| 2006/0139842 A1 | 6/2006 | Shim et al. | |
| 2007/0057278 A1 | 3/2007 | Nakamura et al. | |
| 2009/0289747 A1* | 11/2009 | Duraffourg et al. | 333/219.2 |

FOREIGN PATENT DOCUMENTS

| | | |
|---|---|---|
| WO | 03061470 A1 | 7/2003 |
| WO | 2006076037 A2 | 7/2006 |

OTHER PUBLICATIONS

Deshpande, V.V. et al., "Carbon Nanotube Linear Bearing Nanoswitches," Nano Letters, vol. 6, No. 6, 2006, pp. 1092-1095, May 10, 2006.
Chang, L. et al., "Micromachined Magnetic Actuators Using Electroplated Permalloy," IEEE Transactions of Magnetics, vol. 35, No. 3, May 1999, pp. 1976-1985.
Magfusion Inc., "A Magnetic MEMS-Based RF Relay—Development of a Switch Technology that Uses Magnetic Fields to Assist in Both Switch Actuation and No-power Latching," Microwave Journal, Jan. 28, 2004.
Prejbeanu, I. L., et al., "Thermally Assisted Switching in Exchange-Biased Storage Layer Magnetic Tunnel Junctions," IEEE Transactions on Magnetics, vol. 40, No. 4, Jul. 2004, pp. 2625-2627.
Rueckes, T. et al., "Carbon Nanotube-Based Nonvolatile Random Access Memory for Molecular Computing," Science Magazine, vol. 289, Jul. 7, 2000, pp. 94-97.

(Continued)

*Primary Examiner* — Bernard Rojas
(74) *Attorney, Agent, or Firm* — Nixon Peabody LLP

(57) ABSTRACT

A nanoswitch device comprising:
at least one stationary element (52) and at least one element (50) which is at least partially made of a magnetic material and which is movable with respect to the stationary element,
means of activating the movable element, comprising:
and at least one first and one second magnetic means (30, 30', 40, 40') each having a planar shape, defining a first and a second plane, in order to generate remanent magnetization in a direction contained within said first plane or perpendicular to this first plane,
means (36, 36') for reversing the direction of the remanent magnetization of at least one of said first and second magnetic means.

31 Claims, 20 Drawing Sheets

(56) References Cited

OTHER PUBLICATIONS

Zhang Y. et al., "Low-Stress Permalloy for Magnetic MEMS Switches," IEEE Transactions on Magnetics, vol. 42, No. 1, Jan. 2006, pp. 51-55.

Ziegler, J. et al., "Bistable Nanoelectromechanical Devices," Applied Physics Letters, vol. 84, No. 20, May 17, 2004, pp. 4074-4076.

Sort, J. et al., "Exchange Bias in Antiferromagnetic-Ferromagnetic-Antiferromagnetic Structures Magnetization with Out-of-plan Magnetization," Physical Review B 72, 2005, pp. 104412-1-104412-6, Sep. 8, 2005.

Cleland, A. N. et al., "Fabrication of High Frequency Nanometer Scale Mechanical Resonators from Bulk Si Crystals," Applied Physics Letters vol. 69 (18) Oct. 18, 1996, pp. 2653-2655.

Wang, J. et al., "1.156-GHz Self-Aligned Vibrating Micromechanical Disk Resonator," IEEE transactions on ultrasonics, ferroelectrics, and frequency control, vol. 51, No. 12, Dec. 2004, pp. 1607-1628.

Nguyen, C. et al., "An Integrated CMOS Micromechanical Resonator High-Q Oscillator," IEEE Journal of Solid-State Circuits, vol. 34, No. 4, Apr. 1999, pp. 440-455.

Chimot, N. et al., "Gigahertz Frequency Flexible Carbon Nanotube Transistors," Applied Physics Letters No. 91, 2007, pp. 15311-1-15311-13, Oct. 10, 2007.

Abele, N. et al., "Comparison of RSG-MOSFET and Capacitive MEMS Resonator Detection", Electronics Letters, Mar. 3, 2005, vol. 41, No. 52005.

Pourkamali, S. et al., "18um Thick High Frequency Capacitive Harpass Resonators With Reduced Motional Resistance", Solid-State Sensor, Actuator and Microsystems Workshop, South Carolina, Jun. 6-10, 2004, pp. 392-393.

Zalalutdinov, M. et al., "Frequency-Tuneble Micromechanical Oscillator," Applied Physics Letters, vol. 77, No. 20, Nov. 13, 2000, pp. 3287-3289.

Illic, B. et al., "Virus Detection Using Nanoelectromechanical Devices," Applied Physics Letters, vol. 85, No. 13, Sep. 27, 2004, pp. 2604-2606.

Wang, C. et al., "Ultrasensitive Biochemical Sensors Based on Microcantilevers of Atomic Force Microscope," Analytical Biochemistry 363, 2007, pp. 1-11, Jan. 4, 2007.

Agache, V. et al., "Fabrication and Characterization of 1.1 GHz Blade Nanoelectromechanical Resonator," Applied Physics Letters, No. 86, 2005, pp. 213104-1-213104-3, May 16, 2005.

Sazonova, V., et al., "A Tunable Carbon Nanotube Electromechanical Oscillator," Nature Publishing Group, vol. 431, Sep. 16, 2004, pp. 284-287.

Arcamone, J. et al., "A Compact and Low-Power CMOS Circuit for Fully Integrated NEMS Resonators," IEEE Transactions on Circuits and Systems -II, Express Briefs vol. 54, No. 5, May 2007, pp. 377-381.

Lin, Y. W. et al., "Series-Resonant VHF Micromechanical Resonator Reference Oscillators," IEEE Journal of Solid-State Circuits, vol. 39, No. 12, Dec. 2004, pp. 2477-2491.

Koskenvuori, M. et al., "Temperature Measurement and Compensation Based on Two Vibrating Modes of a Bulk Acoustic Mode Microresonator," IEEE, MEMS, Tucson AZ, Jan. 13-17, 2008, pp. 78-81.

Voiculescu, I., et al., "Electrostatically Actuated Resonant Microcantilever Beam in CMOS Technology for the Detection of Chemical Weapons," IEEE Sensors Journal, vol. 5, No. 4, Aug. 2005, pp. 641-647.

Ekinci, K. L. et al., "Ultrasensitive Nanoelectromechanical Mass Detection," Applied Physics Letters, vol. 84, No. 22, May 31, 2004, pp. 4469-4471.

French Preliminary Search Report dated Nov. 18, 2008.

Beunder, M. et al., "A New Embedded NVM Technology for Low-Power, High Temperature, Rad-Hard Applications," IEEE, Non-Volatile Memory Technology Symposium 2005, Nov. 21, 2005, pp. 65-68.

Cavendish Kinetics News, Embedding memory, 2006 (month unknown), 2 pages.

Dujardin, E. et al., "Self-Assembled Switches Based on Electroactuated Multiwalled Nanotubes," Applied Physics Letters, vol. 87, Nov. 3, 2005, pp. 193107-1-193107-3.

Jang, J. E. et al., "Nanoelectromechanical DRAM for Ultra-large-scale Integration (ULSI)," Electron Devices Meeting, IEDM Technical Digest, IEEE International 2005, Dec. 2005, pp. 261-264.

Lovellette, M. N. et al., "Nanotube Memories for Space Applications," IEEE Aerospace Conference Proceedings, vol. 4, Mar. 2004, pp. 2300-2305.

Prejbeanu, I. L. et al., "Thermally Assisted MRAM," Journal of Physics: Condensed Matter, vol. 19, 165218, Apr. 2007, pp. 1-23.

Matsuura, T. et al., "Silicon Micro Optical Switching Device with an Electromagnetically Operated Cantilever," Sensors and Actuators A: Physical, vol. 83, Issue 1-3, May 22, 2000, pp. 220-224.

Ruan, M., et al., "Latching Microelectromagnetic Relays," Sensors and Actuators A: Physical, vol. 91, Issue 3, Jul. 15, 2001, pp. 346-350.

Ward, J.W. et al., "A Non-Volatile Nanoelectromechanical Memory Element Utilizing a Fabric of Carbon Nanotubes," IEEE Non-Volatile Memory Technology Symposium 2004, Nov. 15-17, 2004, pp. 34-38.

Zhang, Y. et al., "Design and Analysis of the Micromechanical Structure for an Electromagnetic Bistable RF MEMS Switch," Microwave Conference Proceedings, APMC 2005, Dec. 4-7, 2005, 4 pages.

Yu-Wei et al., "60-MHz Wine-Glass Micromechanical-Disk Reference Oscillator," IEEE International Solid-State Circuits Conference, 2004, Digest of Technical Papers, ISSCC, Session 17, MEMS and Sensors, 17.7., Feb. 15-19, 2004, 10 pages.

Pourkamali, S. et al., "Vertical Capacitive SiBARs"; 18th IEEE International Conference on Micro Electro Mechanical Systems, MEMS 2005, Jan. 30-Feb. 3, 2005, pp. 211-214.

Grate, J. et al., "Hybrid Organic/Inorganic Copolymers with Strongly Hydrogen-Bond Acidic Properties for Acoustic Wave and Optical Sensors," Chemistry of Materials, vol. 9, Issue 5, May 15, 1997, pp. 1201-1207.

Cleland, A.N. et al., "External Control of Dissipation in a Nanometer-scale Radiofrequency Mechanical Resonator," Sensors and Actuators A: Physical, vol. 72, Issue 3, Feb. 16, 1999, pp. 256-261.

Nguyen, C. "Vibrating RF MEMS for Next Generation Wireless Applications," IEEE 2004 Custom Integrated Circuits Conference, Oct. 3-6, 2004, pp. 257-264.

\* cited by examiner

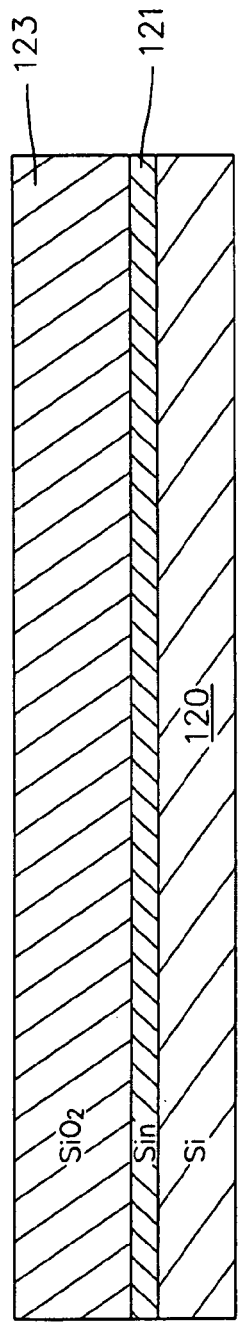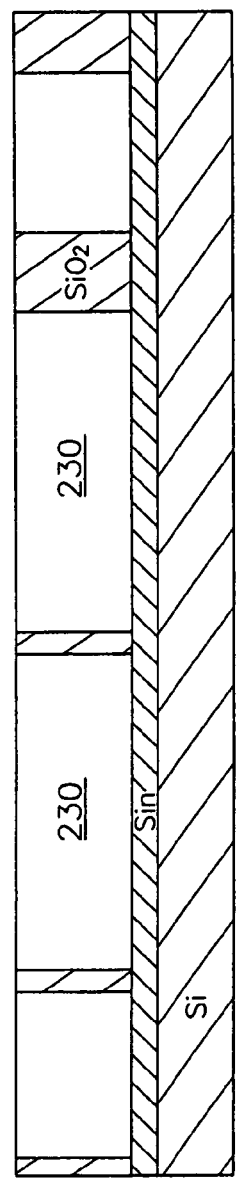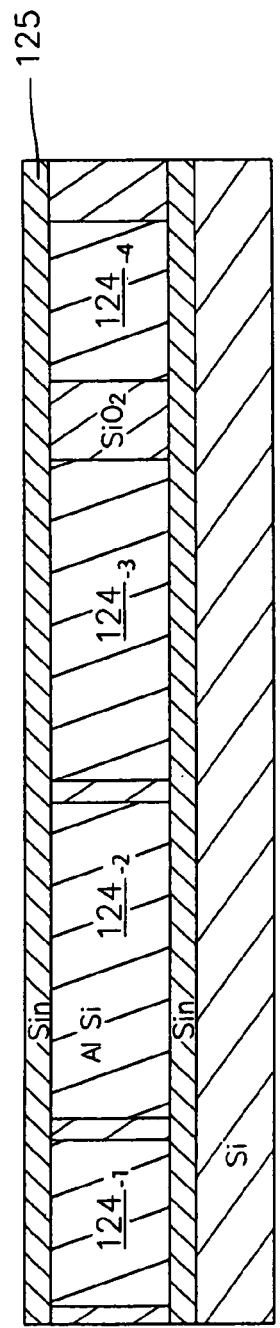

BISTABLE MAGNETIC NANOSWITCH

CROSS REFERENCE TO RELATED APPLICATIONS OR PRIORITY CLAIM

This application claims priority to French Patent Application No. 08 52061, filed Mar. 28, 2008.

TECHNICAL FIELD AND PRIOR ART

The invention relates to the field of bistable nanoswitches.

The typical dimensions of a nanoswitch correspond to a length of a few micrometers (e.g., between 1 μm and 10 μm, e.g., 5 μm) for a section of a hundred nanometers by a few tens of nm (e.g., between 100 nm and 500 nm×10 nm and 100 nm). The gap (i.e., the distance separating the movable portion from the stationary portion of the switch) is typically of the order of several tens of nanometers (e.g., between 10 nm and 500 nm, e.g., equal to 50 nm).

A certain number of nanoswitch embodiments are known, all of which are actuated by electrostatic force.

In particular the silicon-based technology of Cavendish Kinetics is known, which is described at the site http://www-.cavendish-kinetics.com/. This technology uses an electrostatically actuated sub-micrometric beam 1, as shown in FIGS. 1A-1D.

In the position of rest, the beam 1 is situated parallel to a conductive surface 2. It is possible to bring each of these elements to a particular voltage, and to thus establish a desired potential difference therebetween.

Thus, in FIG. 1A, the beam 1 is mechanically idle, the voltage difference between it and the conductive substrate 2 being zero. In this OFF position, the system is stable.

In FIG. 1B, the voltage difference between these two elements increases, and an attractive (electrostatic) force is thus applied to the beam, this force tending to bring the latter back towards the substrate 2.

Beyond a certain voltage threshold value Vth, the beam is brought against the substrate 2 and the switch is thus in the ON position (FIG. 1C).

The voltage can be brought back to zero, and the switch remains ON as a result of the adhesional forces on the substrate 2 (FIG. 1D). Consequently, once the actuation force has disappeared, the surface forces are sufficient to hold the structure in the ON position. The structure can therefore only be detached by means of another actuation force, which will pull it towards the initial equilibrium position thereof.

It is possible to integrate this type of nanoswitch with a CMOS electronics system and a programming which uses the native voltage of this CMOS, as described in the article by M. A. Beunder et al., "A New Embedded NVM Technology for Low-Power, High Temperature, Rad-Hard Applications", published in the Non-Volatile Memory Technology Symposium 2005, IEEE, pp. 65-68, 2005.

The disadvantage of the actuation system of this structure is that it is not intrinsically bistable, but that it uses adhesional forces in order to remain in the switched position. Adhesional forces are still poorly understood and poorly controlled, which jeopardizes the reproducibility and reliability of the system.

Until now, the only means of having a non-volatile bistability is to attain an equilibrium between an elastic recall force and a Van der Waals type attractive force, as described in the article by K. J. Ziegler et al., entitled "Bistable Nanoelectromechanical Devices, Appl. Phys. Lett., Vol 84, No. 20, pp. 4074-4076, 2004".

Several embodiments of carbon nanotube-based nanoswitches are also known. Various manufacturing techniques make it possible to mitigate the difficulty of positioning the nanotubes at the desired locations. For example, there is the use of chemical surface treatments, as described in the article by E. Dujardin et al, entitled "Self-assembled switches based on electroactuated multiwalled nanotubes", Appl. Phys. Lett., Vol. 87, 193107, 2005. The implementation of a nanotube fabric is also known.

Several architectures exist for such switches, one of which is referred to as horizontal, in which the nanotubes are parallel to a substrate, and the bistability of which, as previously, comes from the equilibrium between the Van der Waals forces and the elastic forces, and where actuation is achieved owing to the electrostatic force. In this regard, reference can be made to the article by T. Rueckes et al., entitled Carbon Nanotube-Based Nonvolatile Random Access Memory for Molecular Computing, published in Science, Vol. 289, pp. 94-97, 2000.

The document US 2006/0139842 describes a nanotube-based nanoswitch, operating in the series capacitive as well as in the parallel capacitive configuration. It is illustrated by FIGS. 2A and 2B and implements one or several nanotubes 146 which can be electrostatically deflected so as to enter into contact with a dielectric 180 which is situated on the transmission line 160 (this dielectric can likewise be deposited on the nanotubes). The question of detaching the structure is not brought up in this document.

The disadvantage of the systems using carbon nanotubes is that the production, positioning as well as the reproducibility of the physical characteristics of the nanotubes are not yet fully controlled at the industrial scale.

Existing nanoswitch structures are all based on electrostatic actuation. The non-volatile bistability of these nanoswitches is ensured solely by a compromise between the adhesional forces of the switch at the surface and the mechanical recall force, which tends to bring the movable portion back to the initial position thereof. This bistability is therefore not intrinsic to the actuation system because detachment of the movable structure is not immediate, it must be done by means of a reverse actuation force (e.g., with an opposing electrode).

Furthermore, the contact forces which enable the switch to remain in the ON position are still poorly understood, and poorly controlled during manufacture, thereby compromising the reproducibility and reliability of the system.

Intrinsically bistable and non-volatile actuation is based on the alignment of a magnetic moment in an induction: a magnetized movable portion tends to become aligned along the field lines of the permanent induction into which it is plunged. Several microactuators have been manufactured on this principle, as described in the articles "Micromachined Magnetic Actuators Using Electroplated Permalloy", by Chang Liu, and Yong W. Yi, published in IEEE Transaction on Magnetics, Vol. 35, No. 3, pp. 1976-1985, 1999, or "Latching microelectromagnetic relays" by M. Ruan et al., Sensors and Actuators A, Vol. 91, pp. 346-350, 2001.

The lateral dimensions of these systems all remain of the order of about one hundred micrometers. The permanent magnets ensuring the operation of these switches are generally added on manually and are rarely integrated during the system manufacturing process. In all cases, the thicknesses thereof—greater than 10 μm—are not compatible with nanoswitches.

The principle of actuating via alignment of the magnetic moment will be described in connection with FIGS. 3 and 4.

A beam 5 made of a soft ferromagnetic material (e.g., a $Ni_{80}Fe_{20}$ permalloy) is placed above half of a planar coil 7.

The latter, which is placed on a permanent magnet 9, generates a magnetic field Hb the principal direction of which at the beam 5 is parallel to the substrate, and the direction of which depends on the direction of the current passing therethrough. The permanent magnet 9 produces a field perpendicular to the beam 5. The references 70 and 90 designate the field lines of the coil 7 and of the permanent magnet 9, respectively.

The global field results in the horizontal magnetization of the beam. The magnetization will be maintained when the coil 7 field is cut off, owing to the magnetic field of the perpendicular magnet. Owing to its dimensions, the direction of easy magnetization of the beam is parallel to the substrate. When the beam is deflected, the projection of the magnetic field of the permanent magnet along the major axis of the beam is sufficient to maintain the magnetization of the beam in the absence of any current flowing in the coil. The reverse switching is made by reversing the direction of the current in the coil 7, so that the field generated by the coil results in a reversal in the direction of magnetization of the movable portion 5 and therefore the reverse mechanical switching. A moment will appear, which will tend to reverse the structure in order to once again align it in the same direction as the field of the permanent magnet (FIG. 4).

Consequently, in this type of system, a moment M tends to deflect the movable element (the magnetization $B_{beam}$ of which comes from the field created by the coil), so as to align it in the field of the permanent magnet $B_{magnet}$ built into the substrate.

A system such as this requires an energy input solely for switching (ON→OFF and OFF→ON), whereas the ON state as well as the OFF state are energy-stable, which gives the system the characteristic of non-volatile bistability. Furthermore, once the structure has been placed in contact with the substrate (FIG. 4), the detachment thereof is facilitated, because, not only is the mechanical recall force acting, but a reverse moment is also created. Therefore, there is no need for a reverse actuation system, since the same structures are used for switching in both directions.

When the magnetization is reversed, a moment M appears, which tends to align the magnetic moment of the beam 5 in the same direction as the field lines of the permanent magnet 9, thereby toggling the system into the OFF position.

This principle of reversal poorly supports a reduction in scale, since the field which would be generated by a nanocoil with an acceptable current density would be too weak to carry out the toggling. For example, the magnetic field generated by a metal wire having a square cross-section of 20 nm by 20 nm, with a spacing of 50 nm, which is compatible with a nanoswitch, is of the order of 13 µT, for a typical current density of $10^6$ A/cm$^2$, while the useful field should be of the order of, or greater than several milliteslas.

Furthermore, the use of macroscopic magnets to create the permanent magnetic field does not enable this system to be integrated.

For these two reasons, the known structures do not enable the switch to be co-integrated with the surrounding CMOS-type electronics system. But, co-integration is one of the principal advantages of NEMS in comparison with a microsystem technology.

In other words, scaling down the dimensions of a microswitch completely destroys the sought-after magnetic properties and no longer enables switching or bistability.

The document US 2007/057278 describes a structure which still uses a soft, magnetic torque-sensitive material. When the field is not confined, the tube is actuated towards the contact. The second stable state is provided solely by the mechanical stiffness which should counterbalance the adhesional force in order to detach from the contact. Furthermore, reversal of the direction of magnetization results from the use of a spin current passing through the mechanically fixed magnetic portion; this spin current makes it possible to change the direction of magnetization of one of the 2 magnetic means, which induces a resultant radiating (see FIG. 28 of this document) or confined (see FIG. 27 of this document) magnetic field.

The problem thus arises of finding a new bistable, magnetically actuated switch structure of reduced dimensions, i.e., compatible with a nanoswitch-type structure.

DISCLOSURE OF THE INVENTION

In order to solve this problem, the invention proposes a switch or a nanoswitch device or a sub-micronic switch comprising:

at least one stationary element and at least one element which is at least partially made of a magnetic material and which is movable, pliable or flexible with respect to the stationary element, means of activating the movable element.

Said means of activating the movable element may comprise:

at least one first magnetic means, having for example a planar shape, defining a first plane, in order to generate remanent magnetization in a direction contained within said first plane or perpendicular to this first plane, at least one second magnetic means, having for example a planar shape, defining a second plane, in order to generate remanent magnetization in a direction contained within said second plane or perpendicular to this second plane.

A device according to the invention may further comprise:

means for reversing the direction of the remanent magnetization of at least one of said first and second magnetic means.

The invention makes it possible to produce an intrinsically bistable device and allows for various configurations. In particular, according to one of these configurations, the movable element can come into contact with the stationary element: for example, the flexibility of same enables it to be partially pressed against this stationary element.

The invention makes it possible to produce a structure the magnetic fields of which, at the submicrometric scale, are sufficiently intense for bistable mechanical actuation.

According to the invention, reversal of the direction of the remanent magnetization of at least one of the first and second magnetic means can be obtained by a thermal effect. It is not obtained by a current, in particular a spin current passing through the magnetic portion, this latter technique being that of the document US 2007/057278. In this document, actuation is not made bistable by reversing the magnetization. On the contrary, according to this invention, the resulting magnetic field is radiating, but in 2 opposite directions, the second direction being obtained from the first by reversing the magnetization.

In this invention, when the resulting field is reversed, the torque direction reverses and counterbalances the adhesional force. Therefore, there is no need for mechanical stiffness in order to modify the position of the movable element.

The movable element can be made of a soft magnetic material.

The first and second planes of the first and second magnetic means can be coincident: this is the case, in particular, if the first and second magnetic means are situated in a single geometric plane, e.g., at the same level on or in a substrate.

Magnetic means of planar shape have preferably a total thickness e which is small in comparison with at least one, or with each, of the two other dimensions (width and depth); for example e is less or equal than 10% of at least one, or of each, of the two other dimensions, each of the 3 dimensions being measured along perpendicular directions in the 3D space.

According to one embodiment, the first and second magnetic means can be part of the stationary element.

The first magnetic means can have remanent magnetization which is fixed in one direction contained in said first plane.

The second magnetic means can then have remanent magnetization which is reversible in one direction contained in said second plane.

According to an alternative, the second magnetic means have remanent magnetization which is reversible in a direction perpendicular to said second plane.

The second magnetic means can have remanent magnetization which is fixed in a direction perpendicular to said second plane.

In this case, the first magnetic means can have remanent magnetization which is variable in one direction contained in said first plane.

A device such as this can comprise a plurality of second magnetic means having remanent magnetization which is fixed in a direction perpendicular to said first plane.

According to another embodiment, the movable element comprises the first magnetic means, and the second magnetic means are part of the stationary element.

The first magnetic means can have remanent magnetization which is fixed in one direction contained in said first plane.

The second magnetic means can have remanent magnetization which is variable in a direction perpendicular to said second plane.

Alternatively, the second magnetic means can have remanent magnetization which is variable in a direction contained in said second plane.

The first and second magnetic means can then be arranged in line with one another when the movable portion is in the position of rest.

A device such as this can comprise an axis of rotation about which a first portion and a second portion of the movable element can pivot, each portion of this movable element comprising at least one first magnetic means, the stationary element comprising at least one second magnetic means, each being arranged so as to cooperate with a first magnetic means of the movable element.

According to yet another embodiment, a device according to the invention comprises first and second magnetic means arranged on both sides of the movable portion of the nanoswitch device.

In a device such as this, the first and second magnetic means can have remanent magnetization in a direction contained in said second plane, at least one of these magnetizations being variable.

The movable portion can be arranged in the same plane as the first and second magnetic means and be movable in this plane. Alternatively, the movable portion is arranged and is movable in a plane parallel to a plane defined by the first and second magnetic means. In either case, the first and second magnetic means can have remanent magnetization in a direction contained in the plane thereof, at least one of these magnetizations being variable.

Irrespective of the embodiment, at least one magnetic means having remanent magnetization perpendicular to the plane thereof can comprise a stack of multilayers CoPt.

A structure such as this is compatible with a nanometric embodiment, since a stack such as this can have a maximum thickness of between 10 nm and 20 nm.

Irrespective of the embodiment, at least one magnetic means having remanent magnetization in a direction contained in the plane thereof can comprise at least one layer of a ferromagnetic material and at least one layer of an antiferromagnetic material. Here again, an element such as this is compatible with a nanometric embodiment.

The antiferromagnetic material, for example, can then be of PtMn or NiMn composition, and the ferromagnetic material of CoFe or NiFe composition. Or else, the antiferromagnetic material can be of IrMn or FeMn composition, and the ferromagnetic material of NiFe or CoFe composition.

The AF layer blocks the magnetization of the F layer in a given direction. However, it is possible to reverse the direction of this magnetization. As a matter of fact, if the temperature of the AF layer exceeds a threshold value (the blocking temperature), it "releases" the magnetization of the F layer, which can then be reversed by the application of a magnetic field. Means can thus be provided for heating the layer of antiferromagnetic material (AF) above the blocking temperature for this layer. These means can comprise a conductor for a current which flows beneath or close to the stack, and which can, if need be, serve to generate the magnetic field applied to the ferromagnetic layer.

Other configurations of these magnetic means are possible.

For example, at least one of said first or second magnetic means includes a stack of layers, such as an alternation of at least one magnetic layer (F) and at least one antiferromagnetic layer (AF). The stack is preferably bounded by two external layers each of which is an antiferromagnetic layer.

At least one of said first or second magnetic means can have reversible magnetization and be associated with means for reversing the magnetization.

Each configuration of a device according to the invention operates via creation of a torque between the structure or the movable element and one or several magnetic elements built into the stationary element (substrate).

The movable portion and the stationary portion can be arranged substantially parallel to one another when the movable portion is in one of the stable positions thereof. In this position, the distance between these two elements is approximately a few tens of nanometers or a few hundred nanometers, e.g., between 10 nm and 500 nm. The movable element comes into contact with the stationary element due to the flexibility thereof, which, under the influence of the magnetic torque, enables it to be partially pressed against this stationary element, while one end of the movable element remains stationary with respect to the stationary element.

Means of reversing the direction of the remanent magnetization of a planar magnetic element, whether this magnetization is oriented in the plane or perpendicular to the plane of this magnetic element, comprise:

heating means, e.g., current-conducting means, means of generating an orienting magnetic field, e.g., current-conducting means.

A single current conductor can possibly ensure both functions of heating and magnetic orientation.

A device according to the invention can further comprise a layer made of a material capable of releasing heat under the influence of an electrical current, which is arranged between the conductive element(s) and the antiferromagnetic layer.

Means can be provided for forming a thermal barrier serving to confine the heat in the magnetic means having planar magnetization and/or of the magnetic means having perpendicular magnetization.

The invention further enables integration of the nanoswitch system with electronic means.

The invention likewise relates to a method for producing a device according to the invention, as described above, this method implementing:

a) a step of forming, on or in a homogeneous or non-homogeneous substrate, one or several magnetic means of planar shape, having planar or perpendicular magnetization, and possibly means for reversing the magnetization of at least one of said magnetic means;

b) the formation of a first sacrificial layer on this substrate, c) the formation of a second layer, made of a material constituting the movable element, on said first sacrificial layer, d) optionally, the formation of one or several magnetic means of planar shape, having planar or perpendicular magnetization, on or in this second layer, e) the etching of the second layer and the removal of the first sacrificial layer, in order to form and then release the movable element.

One or more polishing steps can be implemented for polishing one or several layers or substrates.

During the course of step a), two magnets can be formed on the substrate. These two magnets are therefore in a single plane. Then, over the course of the following steps, a movable element can be formed between these two magnets, the movement of which will occur between these two magnets. In this way, a device having a planar structure is obtained.

Alternatively, over the course of step a), two magnets can be formed on the substrate. Then, over the course of the following steps, a movable element can be formed in a plane parallel to that in which the magnets have been formed, referred to as the plane of the movable element, whereby the movement of this movable element will occur in this plane of the movable element, between two limit positions defined by planes perpendicular to the substrate and passing through the magnets. Here again, a device having a planar structure is obtained.

All of the alternatives and embodiments described above can be obtained by a method according to the invention.

In a device or a method according to the invention:

magnetic means having planar magnetization make it possible to obtain a field which, for example, can be of the order of 1 T or 2 T, or greater than these values, e.g., 2.4 T, the radiated field being capable of being a few mT; e.g., it is between 1 mT and 5 mT or 10 mT at a distance of 200 nm;

and/or magnetic means having perpendicular magnetization make it possible to obtain a field which, for example, can be of the order of 1 T, or greater than 0.5 T or 1 T.

BRIEF DESCRIPTION OF THE FIGURES

FIGS. 21A to 21I show steps of another method of producing a device according to the invention.

DETAILED DISCLOSURE OF PARTICULAR EMBODIMENTS

A device according to the invention comprises a stationary portion and a portion that is movable with respect to the stationary portion. The movable portion, for example, is a plate or a beam, and will hereinafter be designated by either of these terms. This movable portion generally has flexibility, which, under the influence of the torque of the magnetic forces, enables it to come into partial contact with the stationary portion, as seen in FIG. 7B, or which enables it to be bent to a certain degree, as indicated by the arrow 55 of FIGS. 10A, 10B and 11.

A device according to the invention implements magnetic means, or magnets, of planar shape having remanent magnetization of an either irreversible or reversible direction, in the plane of the magnetic means or perpendicular to this plane. In the case of remanent magnetization, reversibility can be obtained by heating and by applying an external magnetic field in the desired orientation and desired direction.

These magnetic means makes it possible to generate torque owing to which the movable portion of the device will be able to move from a first, stable position to a second, also stable position; these are, for example, the OFF position and the ON position of a switch.

Figure 7A:
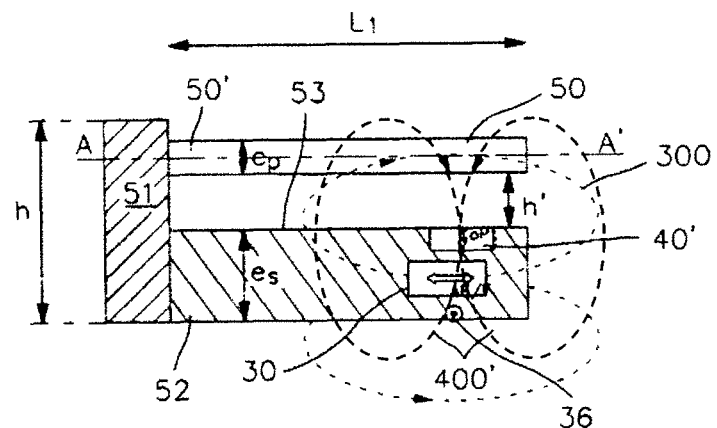
FIGS. 7A to 9 show various intrinsically bistable magnetically actuated nanoswitch devices according to the invention, having out-of-plane movement.
Figure 7B:
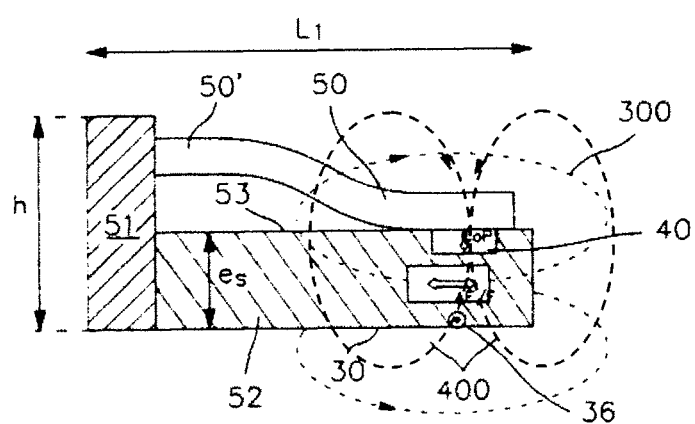

An example of a magnetic torque-actuated nanoswitch system according to the invention is shown in FIGS. 7A and 7B. Other examples will be described later on.

In this example, a nanoswitch comprises a movable portion, e.g., a beam, referenced as 50 in FIG. 7A. this movable portion is in the second stable position thereof (position of rest) in the figure. It is fastened by one of the ends thereof 50' to a stationary base 51. In this example, this movable portion is made of a soft magnetic material, which is preferably deposited in thin layers. This material, for example, is based on Ni and/or Fe and/or Co (such as NiFe, or CoZrNb, or CoFeB).

A substrate 52 forms a so-called stationary portion, which can be integral with the base 51. When the movable portion is in the second stable position thereof (the case of FIG. 7A), it is not in contact with the surface 53 of the substrate 52 (it can be parallel to this surface, but not necessarily, because it can always be attracted by the magnetic means 30, 40'). When the movable portion 50 is activated by magnetic means, as explained hereinbelow, it is deflected, moves closers to the surface 53 of the substrate 52, and finally comes into the first stable position thereof, in contact with this surface 53 (as shown in FIG. 7B).

According to one example, the substrate 52 material is chosen for the thermal and electrical insulation properties thereof: e.g., a silicon or silicon dioxide or silicon nitride substrate can be chosen.

Magnetic means 30 in the substrate 52 enable a magnetic field to be generated (the field lines 300 of which are identified in FIG. 7A), which in turn generates magnetization in the beam 50. This magnetization of the beam is situated substantially or primarily in the plane of the movable portion or the beam. The outline of this plane is identified in FIG. 7A by the axis AA'; therefore, this plane will hereinafter be designated by the expression "plane AA'", and the magnetization thus generated in the beam will be qualified as planar. As will be seen, this magnetization can be reversed within this same plane: in other words, the principal component thereof has a first direction following a certain orientation within the plane AA', but, following the same orientation, it can be brought into the opposite direction. The remanent magnetization produced by the magnetic means 30 is parallel to the surface 53, irrespective of the orientation of this remanent magnetization.

Furthermore, means 40' make it possible to generate magnetization which is substantially perpendicular to the substrate 52 and to the movable portion or to the beam 50. Here, these means take the form of a magnet 40' of planar shape (e.g., in a thin layer, as explained below), having perpendicular magnetization (e.g., multilayer Co/Ni or Co/Pt, or an alloy of iron and platinum or an alloy of iron and palladium), which is built into the substrate 52. This magnet generates field lines 400' which, as seen in FIG. 7A, are substantially perpendicular to the beam 50 in the second stable position thereof (or even in the first stable position thereof, see FIG. 7B).

Combining the fields generated by each of the means 30 and 40', and the possibility of toggling or reversing the remanent magnetization of the magnetic means 30, will enable the movable portion 50 of the nanoswitch to be actuated. This combination results in a torque, which tends to bend the movable element 50, and to bring it into contact with the surface 53 of the substrate 52, which position is shown in FIG. 7B. The end 50' attached to the base 51 remains immobile.

Figure 5A:
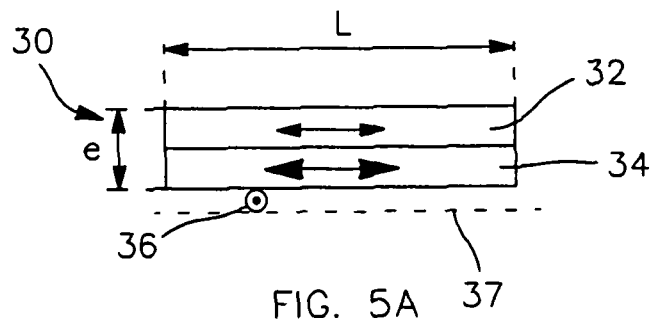
FIGS. 5A to 5F show ferromagnetic layer/antiferromagnetic layer type stacks implemented within the scope of this invention.

An example of means 30 is shown in FIG. 5A and comprises a layer 32 of ferromagnetic material (F) and a layer 34 of an antiferromagnetic material (AF). These two layers form a planar element, since the total thickness e thereof is small in comparison with at least one, or with each, of the two other dimensions; for example e is less or equal than 10% of at least one, or of each, of the two other dimensions. To illustrate, this thickness e is between approximately 50 nm and 150 nm, e.g., equal to approximately 110 nm, for a width L (measured in the plane of FIG. 5A) of the order of magnitude of a few μm to a few tens of micrometers, e.g., between 5 μm and 50 μm, e.g., of the order of 10 μm. The depth of same (dimension perpendicular to the plane of the figure) is of the order of magnitude of a few hundred nm to a few tens of micrometers, e.g., between 200 nm and 50 μm; it is preferably greater than the depth of the beam 50. The ratio L/e can therefore be at least 30 or 100.

The lateral dimensions can be smaller than those indicated above. For example, the depth can be of the order of a few hundred nm, e.g., equal to approximately 200 nm. With a magnet situated underneath the mechanical element, the dimensions of this magnet will advantageously be of the order of a few micrometers, which makes it possible to ensure proper uniformity of the magnetic field.

A heating means is associated with this assembly, e.g., one or several current lines 36 arranged against the antiferromagnetic layer 34, or close to this layer. An intermediate layer of material, e.g., TiN or GeSbTe, capable of releasing heat under the influence of an electrical current (thermistor) can advantageously be arranged between line 36 and layer 34. However, the latter is advantageously as close as possible to the current line 36, so that the most effective heating possible can be ensured. The line or lines 36 are preferably rectilinear so as to generate the most homogenous transverse magnetic field possible (in the plane of layer 34). The description will hereinafter be limited to the case of a single current line, however the case of two lines is easily deduced therefrom.

Layer 34 AF blocks the magnetization of layer 32 in one direction or the other, in the plane of element 30. The field generated by the assembly is also in the plane of element 30 locally.

However, if the temperature exceeds a threshold value (the blocking temperature determined by the antiferromagnetic layer 34, e.g., 150° C.), the magnetization of layer 32 can be reversed by applying a magnetic field, while still remaining in the plane of element 30. In other words, exceeding the blocking temperature of layer 34 makes it possible to release the magnetization of the ferromagnetic layer.

This blocking temperature can be reached or exceeded by applying a current I to the current line 36. The heating thus produced will be transmitted to layer 34.

This current line 36 will likewise enable a magnetic field to be induced, which will orient the magnetization of the ferromagnetic layer 32 and enable this magnetization to be toggled.

Figure 1A:
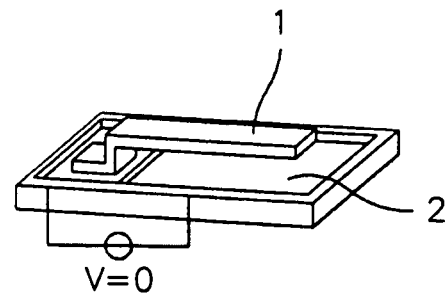
FIGS. 1A-1D show the programming of an electrostatically actuated nanoswitch point.
Figure 1B:
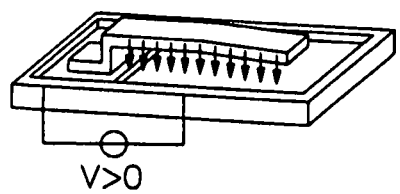
Figure 1C:
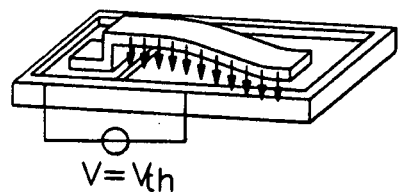
Figure 1D:
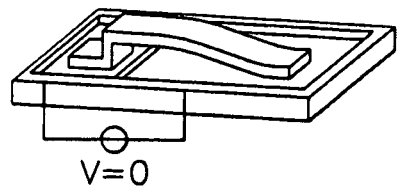
Figure 2A:
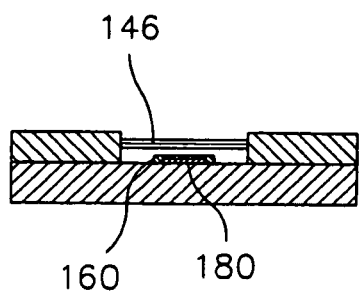
FIGS. 2A and 2B show the operation of a nanotube-based nanoswitch.
Figure 2B:
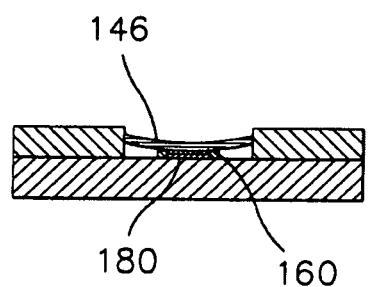
Figure 3:
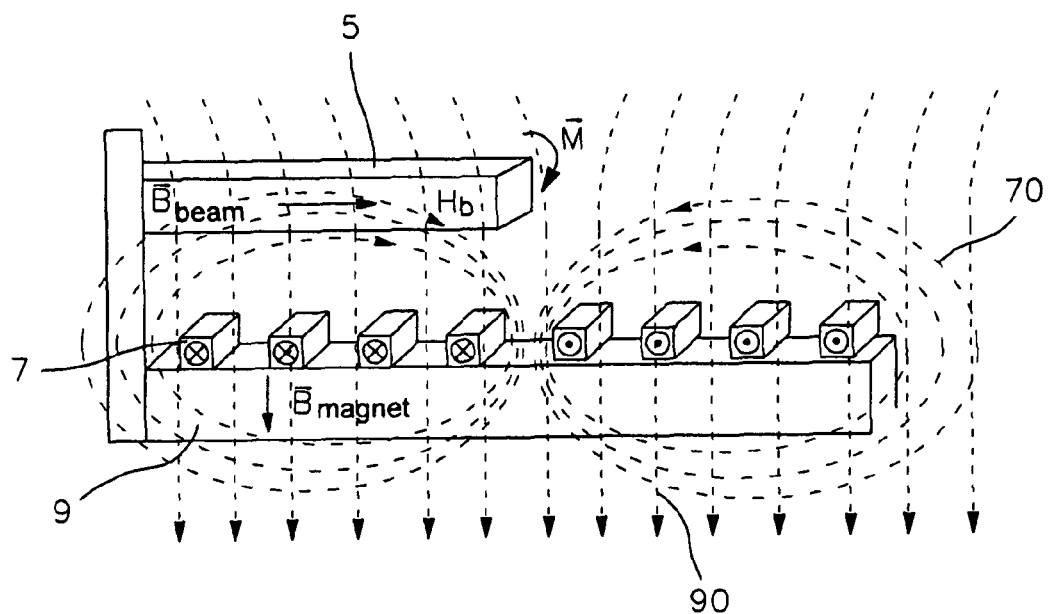
FIGS. 3 and 4 illustrate a principle of bistable actuation via alignment of the magnetic moment.
Figure 4:
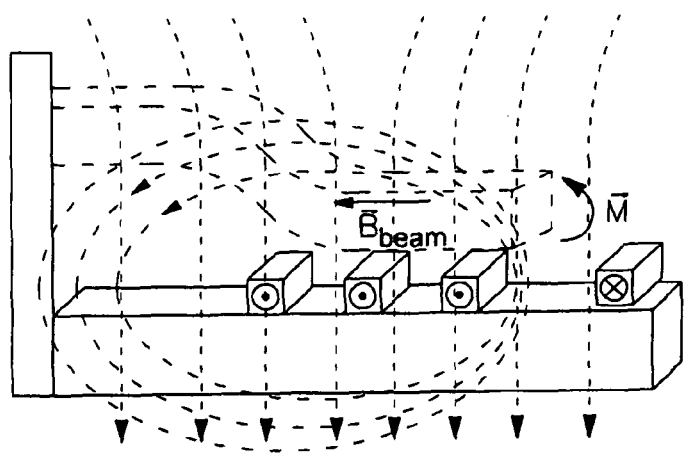
Figure 5B:
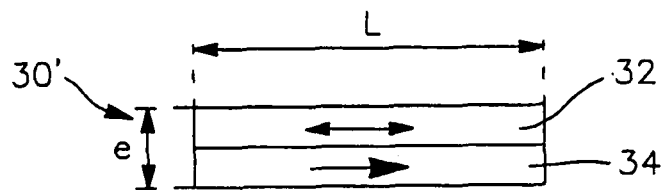

The stack of magnetic layers in the magnetic means having planar and reversible magnetization can comprise more complex alternatives, which make it possible to better control the supply to layer F. For example, as shown in FIG. 5E, a stack comprises an F layer sandwiched between two AF layers. For example again, the structure of FIG. 5F can be produced: it comprises the following stacking: layer AF/layer F/layer AF/layer F/layer AF. Any number of alternating F and AF layers can be provided. It is preferably an uneven number of layers, with an AF layer which bounds the stack at each of the ends thereof, in other words, the assembly of layers is contained between two AF layers, as in FIGS. 1E and 1F.

Figure 5C:
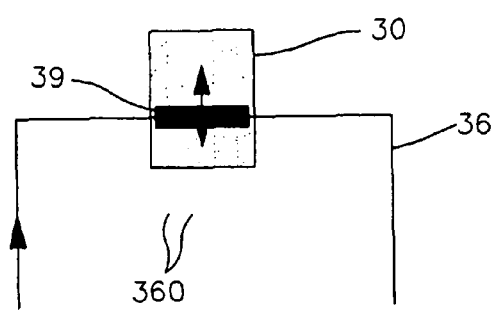

FIG. 5C is a top view of the device of FIG. 5A, wherein element 30 is seen. A thermistor 39, made of TiN or TaN or GeSbTe, for example, is advantageously arranged beneath element 30 and on the path of the current brought by line 36, so as to increase the transfer of heat thereto.

Figure 5D:
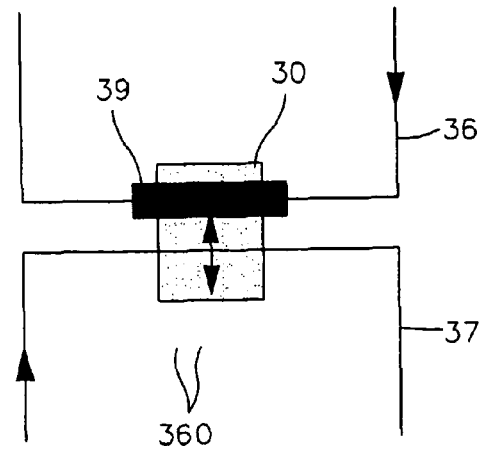
Figure 5E:
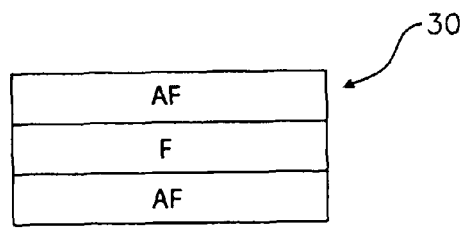
Figure 5F:
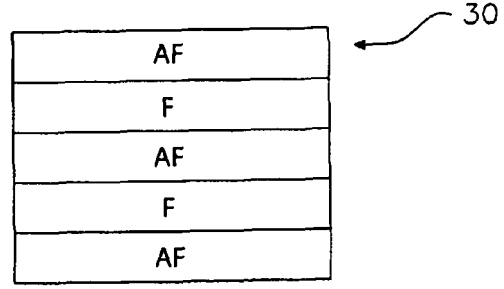

In place of a single current line, there can be 2 (or several) lines, one making it possible to increase the temperature above the toggling temperature, and the other for generating the magnetic field which will make it possible to orient and block magnetization in layer 32. This is what FIG. 5D shows, which is likewise a top view of such a device, wherein element 30 and the above-mentioned thermistor 39 arranged as explained above are seen again. However, a second current line 37 likewise passes beneath element 30 and enables a magnetic field to be generated therein.

The field lines 360 generated by the current flowing in line 36 (FIG. 5C) or in line 37 (FIG. 5D) are likewise shown in both FIGS. 5C and 5D.

Irrespective of the form of the current line or lines, there is no current flow through the F/AF stack for actuating the switch.

It is therefore possible to reverse the magnetization of layer 32, and therefore the field generated by element 30 within its own plane, owing to conductors 36 and 37, applied against or in the vicinity of element 30. A single conductor 36 is advantageously used to ensure the heating and magnetic field application function.

Once the magnetization of layer 32 has been reversed, it generates a magnetic field in the plane of element 30, having a direction opposite that which it generated before.

Figure 12A:
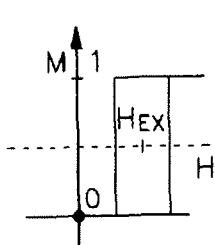
FIGS. 12A-12C show the magnetization-reversing mechanism for an AF/F layer.
Figure 12B:
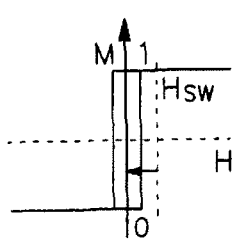
Figure 12C:
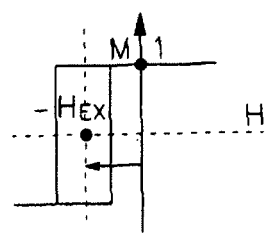

FIGS. 12A-12C show the writing mechanism of element 30 AF/F, in the case where two conductors 36, 37 are present, one for ensuring the heating function, the other for generating a magnetic field. Let $I_H$ represent the current flowing in the conductor and serving to generate the magnetic field and let $I_T$ be the current flowing in the conductor and serving to heat the AF layer. At ambient temperature, and on the basis of the outside magnetic field H, the hysteresis loop of the magnetization M of the stack is offset by $H_{ex}$ (also called the stiffening field), with the result that, for a zero outside magnetic field $H_{sw}$, there is remanent magnetization (negative in this case, see FIG. 12A), and $I_H=0$, $I_T=0$.

Then (FIG. 12B), the layer is heated to above the blocking temperature ($I_T>0$), and the cycle is offset so as to cancel $H_{ex}$. During the same time period, the stack is exposed to an outside magnetic field $H_{sw}$, ($I_H<0$), such that $H_{sw}$ be of a sign opposite that of initial $H_{ex}$ and that $|H_{sw}|>|H_{ex}|$.

Finally, the heat is turned off (the temperature returns to ambient temperature), the material cools under field $H_{sw}$ and acquires an offset of $-H_{ex}$, after cooling (FIG. 12C, $I_H=0$, $I_T=0$).

A thermistor (e.g., a layer of TiN or GeSbTe) can be placed between the conductor 36 and the stack 30 so as to heat layer 34, and/or a thermal barrier (e.g., made of TiN or GeSbTe) can be placed above the stack 30 so as to prevent dissipation of heat into the air.

It is possible to use:

PtMn or NiMn as an antiferromagnetic layer AF material (high blocking temperature), which can be associated with CoFe, or with NiFe as a ferromagnetic material, or, IrMn or FeMn as an antiferromagnetic layer material, which has a lower blocking temperature than PtMn or NiMn, and which can be associated with NiFe or CoFe as a ferromagnetic layer material.

It is possible to implement these pairs of materials (AF, F): (PtMn, CoFe), (PtMn, NiFe), (NiMn, CoFe), (NiMn, NiFe) (for which Tb is significant) and(IrMn, NiFe), (IrMn, CoFe) (for which Tb is less significant), within the scope of this invention. The pairs (AF, F) of materials (FeMn, NiFe), (FeMn, CoFe) can likewise be implemented.

In order to obtain strong magnetization, the CoFe material is used, which has a magnetization of 2.4 T (while NiFe has a magnetization of 1 T). Therefore the following pairs (AF, F) are used: (PtMn, CoFe), (NiMn, CoFe), (IrMn, CoFe), (FeMn, CoFe).

One method of producing layers 32, 34, for example, is a cathode or ion beam sputtering method (PVD, IBD "ion beam deposition").

It will be seen hereinbelow that a variant 30' of this element without a conductor 36 (FIG. 5B) can also be implemented in certain embodiments. The magnetization of the ferromagnetic layer 32 then remains fixed or blocked by the antiferromagnetic layer 34 AF, in the plane of this element 30'. In this case, the materials of these layers can be those already indicated above.

Figure 6A:
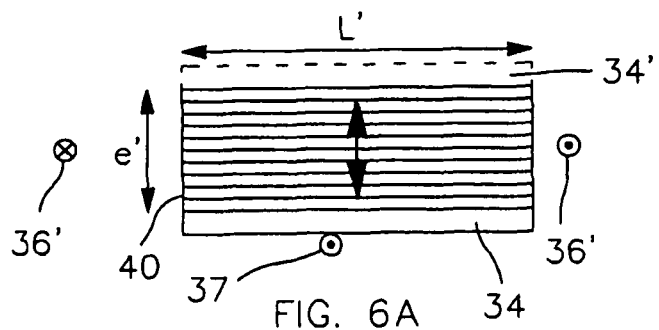
FIGS. 6A to 6C show a stack having perpendicular magnetization, implemented in connection with a device according to the invention.

An example of means 40 is shown in FIG. 6A. These means comprise a magnet made in thin layers, of planar shape, having a field perpendicular to the plane thereof and, here again, at least one layer 34 of an antiferromagnetic layer (AF), e.g., IrMn or PtMn or NiMn. There may be two antiferromagnetic layers 34, 34' arranged on one side and or the other side of the stack 40 of thin layers.

The magnetization can be reversed by conductive means 36'. For example, a coil surrounds element 40 and is arranged in a plane which is substantially perpendicular to the direction of the field generated. Reversal of the remanent magnetization is carried out via a thermal effect, as in the case of the components of FIG. 5A.

There is the possibility of having two conductive means 36', 37, as in the case of FIG. 5D: conductive means 37 enable the antiferromagnetic layers to be heated, and conductive means 36' enable the magnetic field to be applied.

As explained above, the conductor implemented for heating can comprise a thermistor, e.g., made of TiN or TaN or GeSbTe.

Figure 6B:
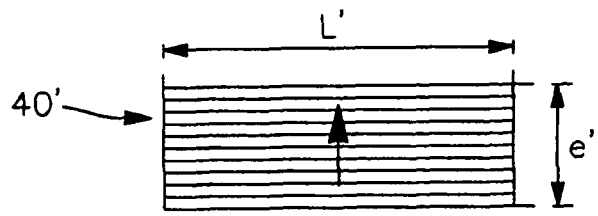

Another example of means 40' which enable remanent magnetization to be generated, which is perpendicular to the plane thereof and permanent, is shown in FIG. 6B. Here again, these means comprise a stack of thin layers and are of planar shape.

In the case of both FIGS. 6A and 6B, the thickness e' is much smaller than the two other dimensions, or in any event different by at least one order of magnitude from these two other dimensions. This magnet is of the multilayer CoPt type or made of other materials.

Figure 6C:
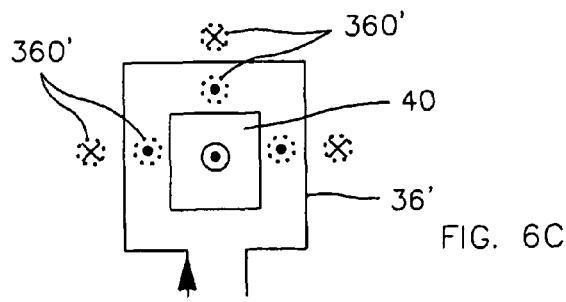

FIG. 6C shows a top view of the device of FIG. 6A. Means 40, with perpendicular remanent magnetization, are surrounded by a coil 36' which heats the layer and generates the magnetic field 360' for reversing the magnetization. The antiferromagnetic layer is not separately visible in this top view.

The choice of the material will depend on the capacity thereof to generate perpendicular magnetization, and while at the same time also taking account of the thickness of the layers constituting the stack 40. To illustrate, remanent magnetization at the surface of the stack 40 or 40', which is less than 1 T, of the order of a few tenths of a tesla, e.g., 0.6 T, or even greater than 0.3 or 0.5 T, is suitable for an application to a nanoswitch according to the invention.

To illustrate again, for the stack 40, 40' of FIGS. 6A-6B, reference can be made to a thickness e' of between 10 nm and 20 nm, e.g., 15 nm, for a width L' of the order of a few hundred nanometers, e.g., between 100 nm and 500 nm, e.g., equal to 400 nm. The thickness e' indicated means that each of the layers of the stack 40 can itself have a thickness of the order of one nanometer, e.g., between 0.5 nm and 1.5 nm. The depth of same can be equal to L', or of the order of magnitude of L'. The antiferromagnetic layer has a thickness of the order of a ten nm, e.g., 2 nm to 15 nm (Phys. Rev. B, 72, 104412, 2005).

The stack 40, 40' can be produced, for example, by cathode sputtering of alternating layers of cobalt and platinum; a (Co/Pt)n pattern is thus obtained, where n is the number of repetitions of the platinum/cobalt stack. It is possible to carry this out in the same way with other compositions.

Irrespective of the embodiments implemented, the two elements which constitute the magnet 40, 40' made of thin layers combined with an AF layer having remanent magnetization perpendicular to the plane thereof, and the AF/F layer 30, 30' having remanent magnetization in the plane thereof, are separated within the substrate 52, for example, by a distance of the order of a few nm or a few tens of nm, e.g., 20 nm. These two elements 30 or 30', 40 or 40', can be arranged on or in a single plane, or one above the other. Advantageously, in order to maximize the position difference of the movable element 50 between the two stable states thereof, the element of weakest magnetization is situated closest to this movable element. Various embodiments of a device according to the invention, with various respective positions of the activation means 30, 30', 40, 40' are described below in connection with FIGS. 13A to 18.

To illustrate, a system according to the invention, as shown in FIGS. 7A and 7B, has a height h (without conductor, see below) of the order of a few hundred nanometers, e.g., 500 nm. The beam 50 can have a thickness ep of a few tens of nanometers, e.g., between 10 nm and 100 nm; for example, it is approximately 50 nm.

The flexibility of the beam 50 is characterized by a stiffness constant less than or equal to a few N/m, e.g., 5 N/m or 10 N/m.

The gap h' (distance between the stationary and movable portions, in the second stable position, or "OFF" position of FIG. 7A) is, for example, substantially between 10 nm or 50 nm and 400 nm, while the insulating substrate 52 has a thickness of approximately 150 nm to 200 nm (without conductor, see below).

In fact, in these embodiments of FIGS. 7A and 7B, the height h and the thickness of the substrate 52 are given without taking account of the conductive elements. These can involve a thickness of the order of 2 μm.

Generally speaking, the substrate 52 can surmount a wafer made of a semiconductor material, e.g., having a thickness of a few tens of μm, in which the heating current and magnetic field-generating line(s) are located.

The width L1 of the system can be approximately a few micrometers to a few tens of micrometers, e.g., between 1 μm and 50 μm. However, this width of the movable element is advantageously nanometric or sub-micronic, e.g., between 50 nm and 1 μm, so as to obtain a compact nanoswitch.

More generally speaking, a nanoswitch, or sub-micronic switch, has a sub-micronic gap h', which is the case with the values indicated above; furthermore, at least one dimension of the movable element is likewise preferably sub-micronic.

An assembly is thus obtained having a volume, for example, of between 30,000 $nm^3$ and 10 $\mu m^3$ (without conductive elements, see above).

Figure 8:
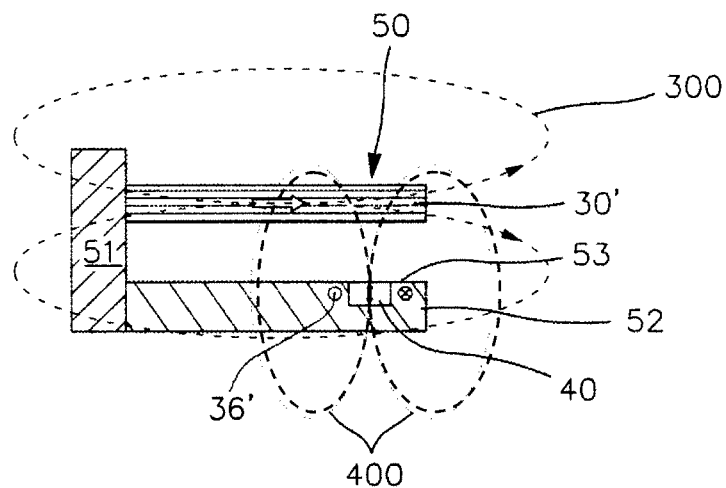

Another embodiment of a device according to the invention is shown in FIG. 8, in which the movable element 50 is in fact itself at least partially a layer or an element 30' of the type described above in connection with FIG. 5B, which makes it possible to generate irreversible remanent magnetization in its own plane. The dimensions of these means 30' are different from those indicated above; they are rather of the order of those indicated for the beam 50 in connection with FIG. 7A. This element 30' interacts with magnetic means 40 having perpendicular remanent magnetization, of the type described above in connection with FIG. 6A and which is built into the substrate 52 and of which the magnetization can be reversed.

Based on the direction of the magnetization of means 40, the movable element 50 is attracted to the substrate 52 or repelled from the substrate 52. A torque results from the interaction between means 30' and 40, which, depending on the direction of the magnetization, tends to bend the movable element 50 so as to align it on the field of the element 40 built into the substrate 52, or, on the contrary, to move the movable element 50 away from the substrate 52. In the switched position (first stable position), the movable element can be in contact with the surface 53 of the substrate 52, as in the case of FIG. 7B.

As an alternative of what is shown in FIG. 8, the movable portion comprises a mechanical support, e.g., a 50-nm layer of Ru, on which are arranged the magnetic means which deform together with the mechanical support.

FIGS. 7A, 7B and 8 are indicative only, and the invention can be used with other geometries and shapes of movable elements, such as torque arms or embedded beams or embedded on both sides. Examples are provided below, in connection with FIGS. 13A to 19.

In order to design a system according to the invention, as described above according to one of the embodiments below, account is taken of the dimensions of the structures used (movable structure 50, magnetic means 30, 30', 40, 40') and the relative positions thereof. Switching of the movable element from one state to another is obtained by reversing the field of one of the magnetic means, which modifies the torque being exerted on the movable element, which makes it possible to obtain two stable states or positions: in one of these stable positions, the movable element is in contact with the substrate (this is the ON position shown, for example, in FIG. 7B), whereas, in the other position, the device is OFF.

Calculating the dimensioning of a device according to the invention can be summarized in the following way.

Starting with the desired characteristics as concerns, in particular, the dimensions of the magnetic nanoswitch (in particular the gap h'), the magnetization values, as well as data concerning the materials used, e.g., Young's modulus for the movable portion (this data can be found in literature or measured), the heightened fields can be calculated around the nominal value of the distance h', and then a mechanical calculation is made of the torque induced by these fields. In other words, a calculation of the fields in the portion of the space wherein the beam is located is made, as well as a calculation of the mechanical parameters (forces and torques in particular) to which it will be subjected. This calculation is iterated until the deflection equilibrium point is found, e.g., the point of equilibrium between the magnetic forces and the elastic recall forces. This deflection is then compared to the distance h' between the beam 50 and the substrate 52, the deflection having to be greater than h' (for the first, ON stable position). Using the deflection calculation, it is possible to modify the relative positions of the magnets/mechanical element(s) in order to seek to optimize the structure, and then the calculations are reiterated. To achieve optimization, account can likewise be taken of the influences of the processes for manufacturing the various layers, by measuring the characteristics of each layer, such as the residual mechanical stresses. Other parameters can be taken into account, e.g., surface forces.

According to one embodiment of the invention, use is made of:

means 30, the magnetization of which can be reversed owing to a current conductor 36 (which generates a magnetic field and heats locally, as already explained above). If a nanocoil were used, the cross-section thereof would limit the current density that could be circulated therethrough, thereby limiting the value of the magnetic field generated. The use of the F/AF layers 32, 34 makes it possible to overcome this problem. The locally planar magnetic field generated by these layers is much greater than the magnetic field which would be generated by a coil the size of which would be adapted to the NEMS;

a multilayer 40, which can be built into the system directly, which enables the device to be integrated completely.

By using these two means combined, a nanostructure can be actuated by modifying the torque exerted on the movable element of a movable structure.

Figure 9:
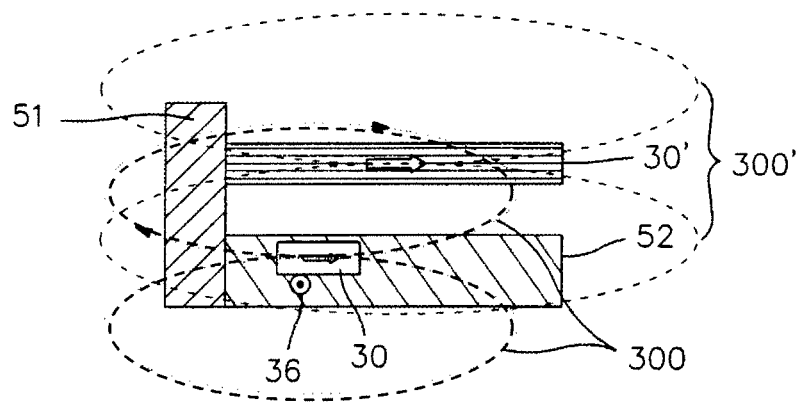
Figure 10A:
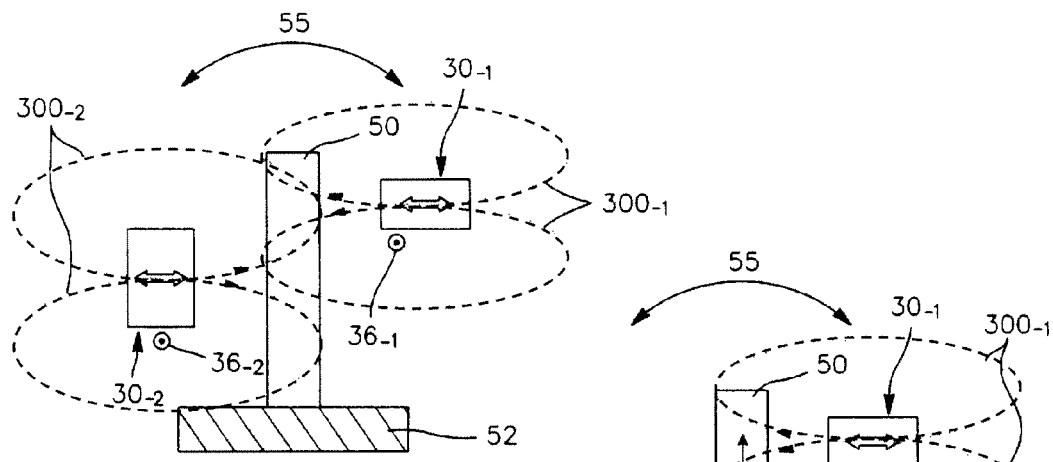
FIGS. 10A to 10D each show an intrinsically bistable magnetically actuated nanoswitch device according to the invention, having in-plane movement.
Figure 10C:
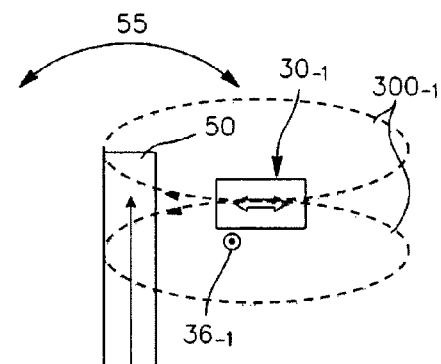
Figure 10B:
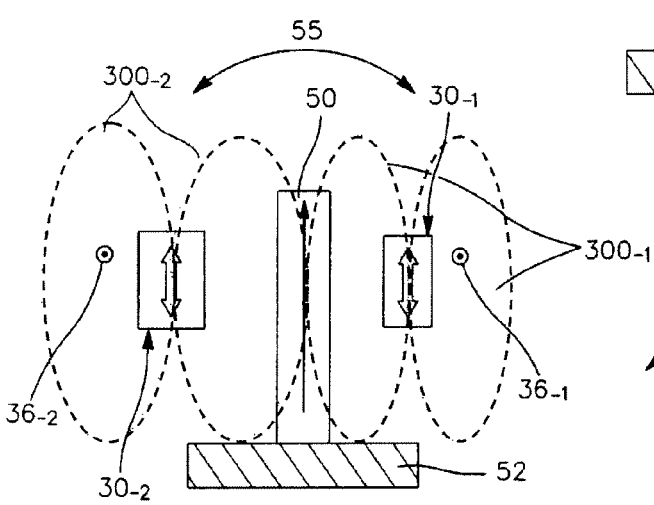
Figure 10D:
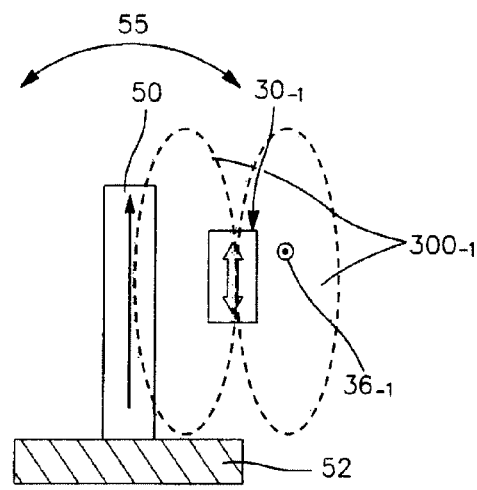
Figure 11:
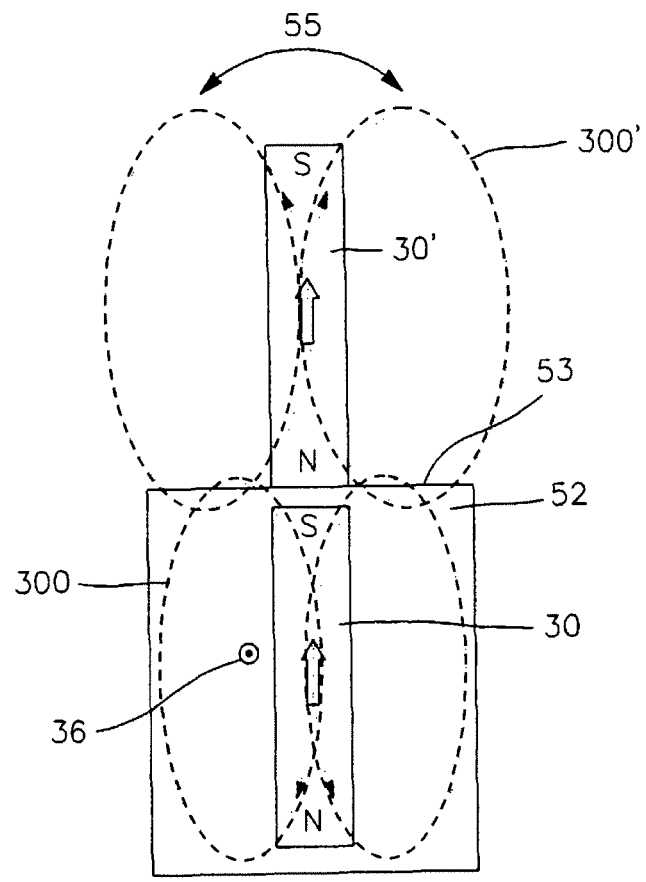
FIG. 11 shows yet another type of nanoswitch device according to the invention.

The embodiments shown in FIGS. 9 to 11 are likewise bistable nanoswitches according to the invention. They implement F/AF layers 30, 30'. The latter have the structure already explained above in connection with FIGS. 5A and 5B. The compositions and dimensions of the layers are likewise those already indicated.

In the embodiment of FIG. 9, the movable element 50 is, as in the case of FIG. 8, in fact itself at least partially a layer or means 30', of the type described above in connection with FIG. 5B. The dimensions of these means 30' are of the order of those indicated for the beam 50 in connection with FIG. 8.

The substrate 52, as in the embodiment of FIG. 7A, comprises an F/AF stack 30, preferably of the type shown above in connection with FIG. 5A, i.e., of the type comprising a conductor 36. It is therefore the magnetization of these means 30 which will be reversed, the magnetization of means 30' remaining fixed.

Based on the relative position of the two magnetizations of means 30, 30', means 50 will be attracted to or repelled from the substrate 52.

As concerns the compositions of the substrate 52, and the F/AF layers of means 30, 30', reference will be made to what was already indicated above in connection with the preceding embodiments. The substrate 52 can have the same insulating properties as the substrate 52 of FIG. 7A.

In FIG. 9, references 300, 300' designate the field lines associated with each of the means 30, 30'. The dimensions of the system of FIG. 9 can be identical or close to those indicated above for the devices of FIGS. 7A-7B or 8.

In this nanoswitch of FIG. 9, the magnetization of the system 30 is reversed, in order for the following actuating principle to be implemented: forces of attraction or repulsion are exerted between the two magnets constituted by the two systems 30, 30', based on the relative magnetic polarizations thereof, which makes it possible to produce movements of the movable element 50 in the plane of FIG. 9. The movable structure 50 can thus switch between two stable positions.

According to another embodiment shown in FIG. 10A, a bistable nanoswitch according to the invention implements magnetic means 30-1, 30-2, at least one of which has reversible magnetization, and is in the plane of each of these means. The latter are arranged on both sides of the movable element 50, which, in this case, takes the form of a beam made of a ferromagnetic material, e.g., FeNi, which is arranged perpendicular to the substrate 52. These layers 30 are of the type shown in FIG. 5A, and of which it is possible to reverse the magnetization via conductive means 36-1 and 36-2. This magnetization is directed, in means 30-1, 30-2 themselves, substantially perpendicular to the direction of the beam 50.

In this nanoswitch of FIG. 10A, as a result of the action of the current in one of the two elements 30-1, 30-2, the planar magnetization of one of these elements is released, so that the actuation principle according to the invention operates: attractive forces of the two magnets 30-1, 30-2 are exerted on the movable element 50, which makes it possible to produce movements of the movable element 50 in the plane of FIG. 10A, in the direction of arrow 55. The movable structure 50 can thus switch between two stable positions. The distance separating the movable element from each of the systems 30-1, 30-2, of the thickness of element 50 is of the same order of magnitude as h', in the structure of FIG. 7A.

Operating on the same principle as that of FIG. 10A, the bistable nanoswitch structure of FIG. 10B comprises magnetic means 30-1, 30-2, at least one of which has reversible magnetization, and is in the plane of each of these means. However, the magnetization that can be reversed via the conductive means 36-1, 36-2, is directed in means 30-1, 30-2 themselves, substantially parallel to the direction of the beam 50. The latter is made of a ferromagnetic material, e.g., FeNi.

Other alternatives are feasible, as illustrated in FIGS. 10C and 10D.

In these two alternatives, the beam is at least partially an AF/F type of permanent magnet (irreversible). A single magnet having reversible magnetization is provided on one of the sides of the beam.

In these nanoswitches of FIGS. 10B-10D, as a result of the action of the current in one of the two elements 30 (or element 30-1), it thus suffices to release the planar magnetization of one of these elements or this element, so that the actuation principle according to the invention operates: attractive forces are exerted between the two magnets consisting of elements 30 (or element 30) and the movable element 50, which makes it possible to produce movements of the movable element 50 in the plane of each of FIGS. 10B-10D, in the direction of arrow 55. The movable structure 50 can thus switch between two stable positions, in the plane of the device. The distance separating the movable element from each of the systems 30 of the thickness of element 50 is of the same order of magnitude as h', in the structure of FIG. 7A.

The field lines 300-1, 300-2 of systems 30-1, 30-2, respectively, are likewise shown by dashed lines in FIGS. 10A-10D.

Here again, the use of structures 30 of the type like that of FIG. 5A enables the device to be integrated completely. The systems 30-1, 30-2 can then be built into a stationary substrate made of Si or SiO2, for example, or be integral with such a substrate.

FIG. 11 shows a top view of yet another configuration, which also implements two magnetic means 30, 30' being magnetized within the plane thereof, of the type shown in FIGS. 5A and 5B, but arranged end-to-end or in line with one another: the two remanent magnetizations of these elements 30, 30' are in a single plane, which is that of each of these elements 30, 30', and are even substantially collinear. They are in a plane parallel to the surface 53 of the substrate 52. This enables movement in the plane of the figure, owing to the torque which appears when the two systems have opposite polarization.

As in the case of FIG. 8, this embodiment has the distinctive feature of the movable element 50 consisting of or comprising one of the magnetic means, in this case means 30'. The other magnetic means 30 is in the substrate 52.

One of the two systems 30, 30', e.g., that of the movable element, can have a fixed magnetization: a current line such as line 36 (see FIG. 5A) is then not necessary, since reversal of the magnetization is not to be carried out at this portion. This system is then that of FIG. 5B.

On the other hand, system 30, which is incorporated into the substrate 52, does indeed have a conductor 36, which, according to the principles already described above, will enable the magnetization to be reversed.

The embodiment of FIG. 11 operates in the following way. If, for example, as shown in FIG. 11, the two elements have a magnetization of the same orientation (in the figure: pole N of each element 30, 30' oriented towards the bottom of the figure and pole S oriented towards the top of the figure), then the global system is stable, and the beam which comprises element 30 remains immobile. If the polarity of one of the two elements is reversed, while that of the other is maintained, the movable element 30 will be deflected in the plane of the figure, as indicated by the arrow 55. References 300, 300' carry the same meaning as in the preceding figure. For FIGS. 10A-11, the dimensions of the various elements, and in particular of the beam and plate, are of the same order of magnitude as the structures of FIG. 7A; additionally, the substrate 52 of these figures has the same insulating properties as the substrate 52 of FIG. 7.

The embodiments shown in FIGS. 13A to 18 are other embodiments of bistable nanoswitches according to the invention.

For all of these embodiments, unless additionally or otherwise specified, the dimensions, materials and production methods are those which have already been stated above. In the following figures, references identical to those found in FIGS. 7A and 7B therein designate identical or similar elements. The operation of these devices, and in particular the switching of the movable element between a first stable position and a second stable position, is, as for the preceding embodiments, a result of the interaction of the stationary magnetic means with the movable beam or plate, or with magnetic means positioned on or in the movable beam or plate, and of the reversal in the direction of the remanent magnetization of one of the magnetic means, which is obtained, as explained above in connection with the embodiments already described, and in particular in connection with FIGS. 5A and 6A. For the embodiments of FIGS. 17A to 18, it is noted that there are in fact three stable positions: it is thus possible to switch from a first one of these stable positions to a second and finally to a third.

Figure 13A:
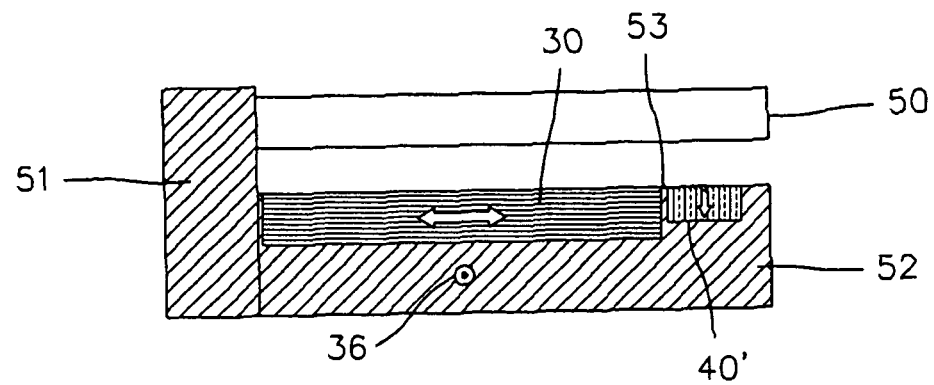
FIGS. 13A to 18 show various alternatives of a device according to the invention and various applications of such a device.

Thus, FIG. 13A shows a device in which the substrate 52 comprises, substantially within a single plane close to the surface thereof 53, both means 40' of which the perpendicular magnetization is irreversible (the case of FIG. 6B) and means 30 having planar magnetization and of which the direction of magnetization is reversible (the conductor 36 of same is likewise shown in the figure).

Figure 13B:
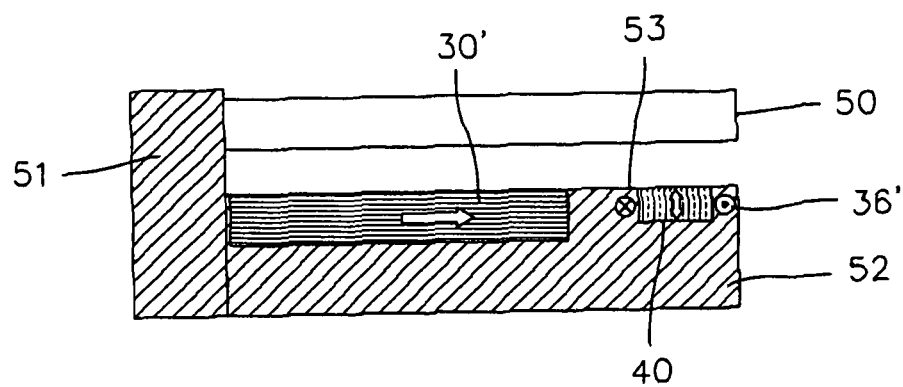

FIG. 13B shows a device in which the substrate 52 comprises, substantially in a single plane close to the surface thereof 53, both means 40 of which the perpendicular magnetization is reversible (the case of FIG. 6A; the conductor 36' is likewise shown in FIG. 13B) and means 30' having planar magnetization and of which the direction of magnetization is irreversible (the case of FIG. 5B).

Figure 14:
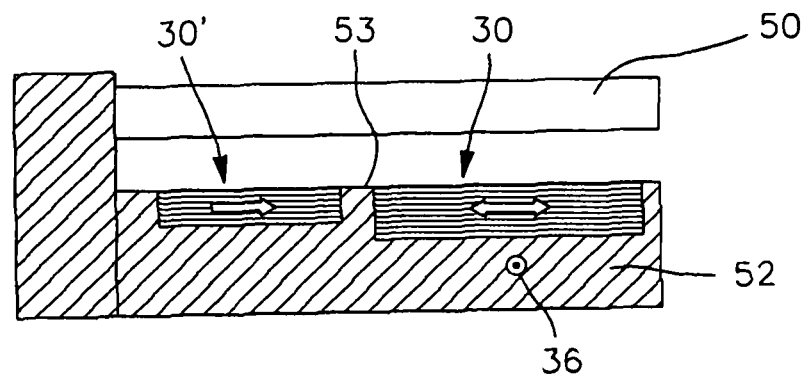

FIG. 14 shows a device in which the substrate 52 comprises, substantially (but not necessarily) in a single plane close to the surface 53 thereof, both means 30' of which the planar magnetization is irreversible (the case of FIG. 5B) and means 30 having planar magnetization and of which the direction of magnetization is reversible (the conductor 36 of same is likewise shown in this figure).

Figure 15:
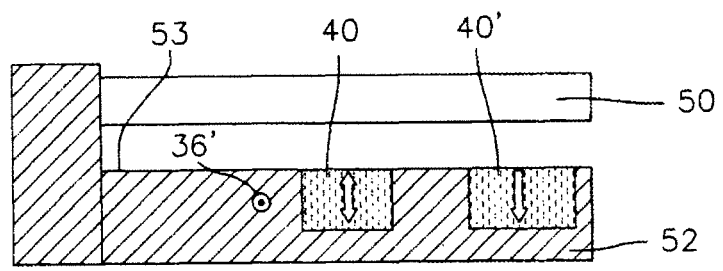

FIG. 15 shows a device in which the substrate 52 comprises, substantially in a single plane close to the surface 53 thereof, both means 40' of which the perpendicular magnetization is irreversible (the case of FIG. 6B) and means 40 having perpendicular magnetization and of which the direction of magnetization is reversible (the conductor 36' of same is likewise shown in this figure).

Figure 16:
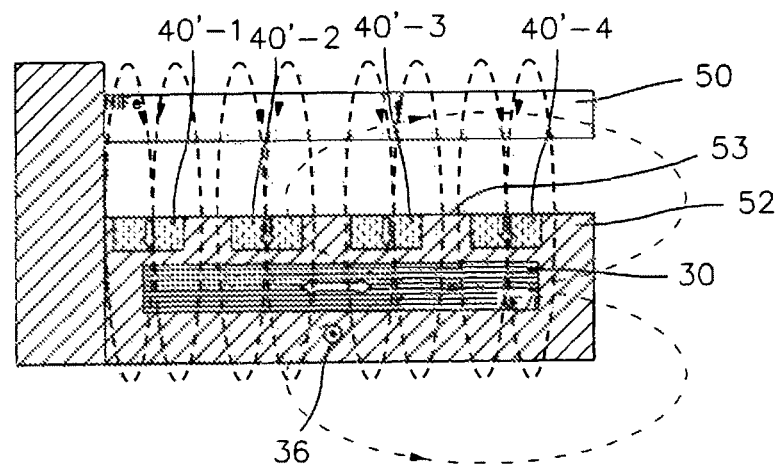

FIG. 16 shows a device in which the substrate 52 comprises, substantially in a single plane close to the surface 53 thereof, a plurality of means 40'-1, 40'-2, 40'-3, 40'-4 of which the perpendicular magnetization is irreversible (the case of FIG. 6B). The magnetization of all of these means is directed in the same orientation and in the same direction, substantially perpendicular to the substrate 52, so as to increase the vertical magnetic field. Means 30 having planar magnetization and of which the direction of magnetization is reversible (the conductor 36 of same is likewise shown in this figure) are likewise arranged in the substrate 52, beneath the plurality of means 40'.

For the embodiments of FIGS. 13-15, the dimensions of means 30, 30', 40, 40', as well as the respective positions thereof, can be adapted according to the context and as required with regard to each of these embodiments.

Figure 17A:
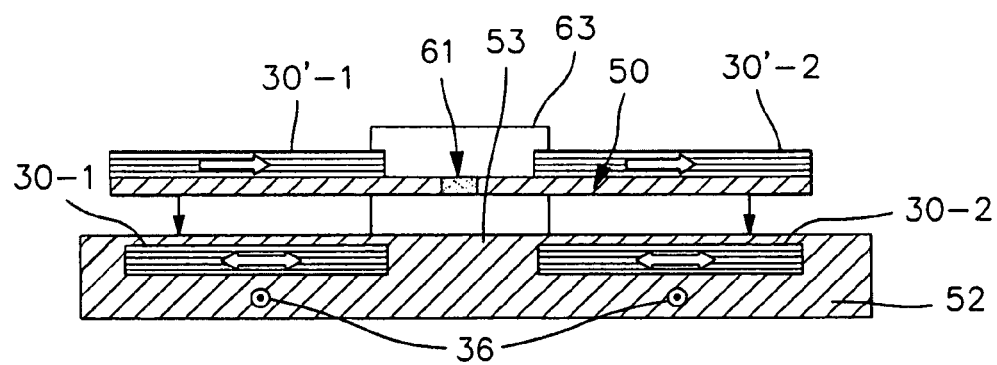
Figure 17B:
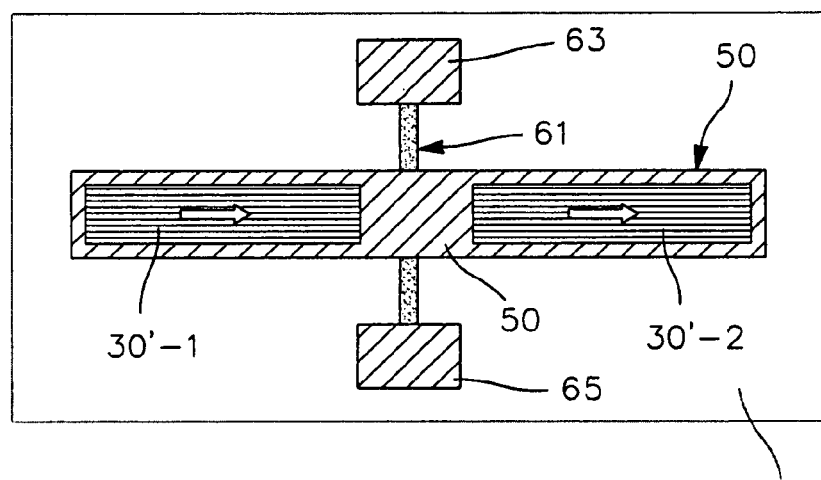

FIGS. 17A and 17B show a side and top view of a device having a different structure. The movable portion 50 (or plate or beam) is arranged symmetrically on both sides of a torque beam 61, which is itself stationary with respect to the substrate 52, to which it is connected by means of pads 63, 65 in which it is embedded, and around which it is capable of pivoting under the influence of the magnetic forces resulting from magnetic means 30'-1, 30'-2, 30-1, 30-2.

The plate or beam 50 is preferably made of a non-magnetic material, the magnetic properties being ensured by means 30'-1, 30'-2 alone. At rest, in the stable position (that shown in FIG. 17A), the gap (the distance between this beam 50 and the surface of the substrate 52) is substantially equal to or of the same order of magnitude as that of the device of FIG. 7A.

The means 30'-1 and 30'-2 associated with the plate or beam 50 (positioned on or in this plate or beam) are of the type presented and described above in connection with FIG. 5B, i.e., having irreversible planar magnetization.

Means 30-1 and 30-2 are of the type presented and described above in connection with FIG. 5A, i.e., having reversible planar magnetization. They are arranged substantially in a single plane close to the surface 53 of the substrate 52, but on both sides of a plane perpendicular to the surface 53 and passing through the arm or axis 61. A conductor 36 is associated therewith, which is also contained in the substrate 52. These means 30-1 and 30-2 and the conductors thereof 36 make it possible to generate magnetizations which, although contained in the same plane, substantially parallel to the surface 53 of the substrate 52, can be of opposite directions. The torque exerted by the magnetic means 30-1 and 30-2, which are built into the substrate 52, on the magnetic means 30'-1 and 30'-2 associated with the plate or with the beam 50, enables the latter to be pivoted about the arm 61, in one direction or the other.

As indicated in FIG. 17B, this arm 61 is itself connected to the pads or embedding means 63, 65 which, for example, are connected to the stationary substrate 52.

Figure 18:
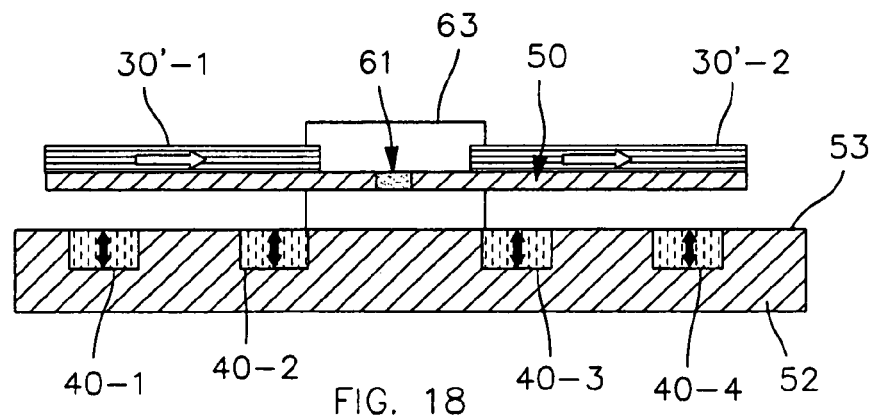
Figure 19A:
FIGS. 19A to 20C show steps of methods of producing a device according to the invention, as well as another type of nanoswitch device according to the invention.
Figure 19B:
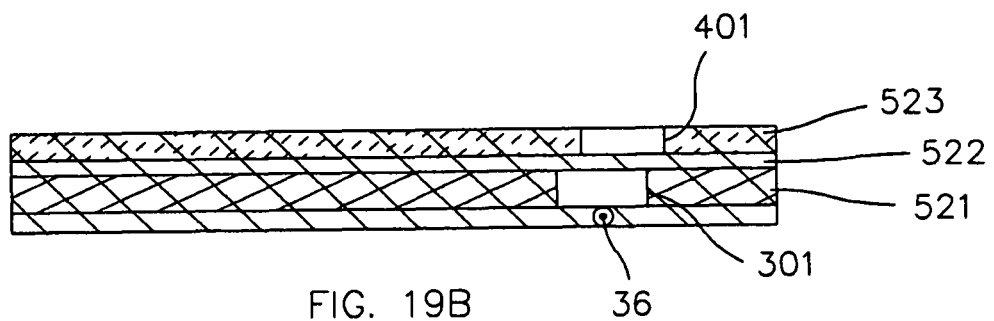
Figure 19C:
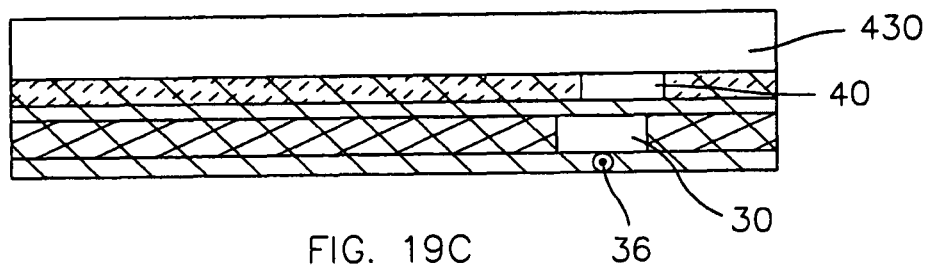
Figure 19D:
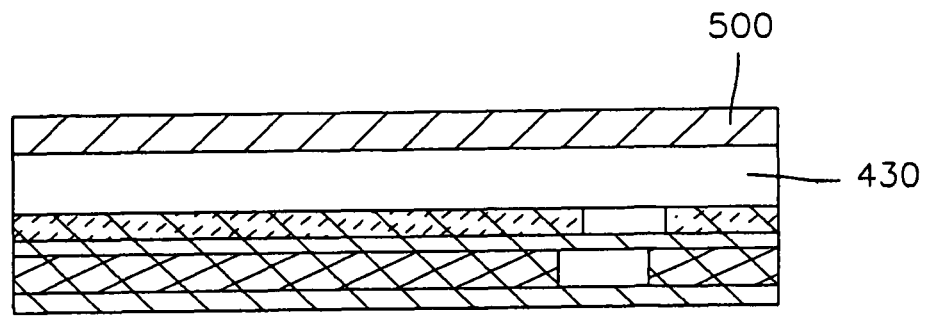

In this structure, and that of FIG. 18, the plate or beam 50 can be tilted about the axis 61 while still remaining stiff.

The structure of the device of FIG. 18 is similar to that of the device just described in connection with FIGS. 17A and 17B.

However, in this embodiment, the substrate 52 does not comprise magnets having planar remanent magnetization, but a plurality of magnets 40-1, 40-2, 40-3, 40-4 having perpendicular and reversible magnetization, of the type presented and described above in connection with FIG. 6A. They are arranged substantially in a single plane close to the surface 53 of the substrate 52. A conductor is associated with each of them, which is also contained in the substrate 52, and which makes it possible to reverse the magnetization of the element with which it is associated.

These means 40-1, 40-2, 40-3, 40-4 and the conductors associated therewith make it possible to generate magnetizations which are directed substantially perpendicular to the surface 53 of the substrate 52, but in opposite directions on both sides of a plane perpendicular to the surface 53 and passing through the torque arm 61. The torque exerted by the magnetic means 40-1, 40-2, 40-3, 40-4, which are built into the substrate 52, on the magnetic means 30'-1 et 30'-2 associated with the plate or the beam 50, make it possible to pivot the latter about the arm 61, in one direction or the other.

As in the case of FIG. 17B, this arm 61 is itself connected to pads or embedding means 63, 65, which, for example, are connected to the stationary substrate 52.

Generally speaking, a device according to the invention can be produced via deposition, substrate-etching and sacrificial layer-etching microelectronics techniques. These steps can be carried out in a variable order, based on the desired final structure. For a nanoswitch with a gap h' of less than 500 nm, it is preferable to use a dry-etching method for releasing the movable portion.

A first method of producing a device according to the invention will now be described in connection with FIGS. 19A to 19D.

A method of producing a magnet on a substrate will first be indicated specifically in connection with FIGS. 23A-23C and FIGS. 24A-24C.

Figure 23A:
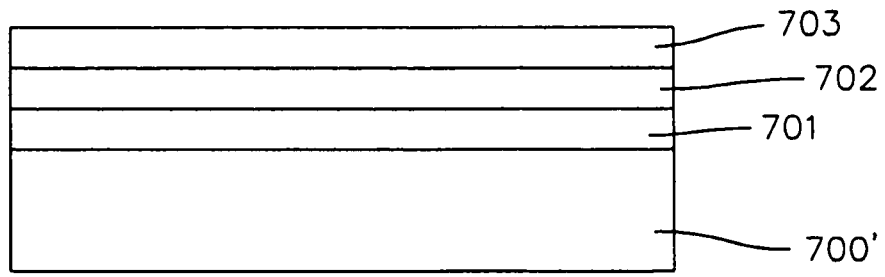
FIGS. 23A to 24C show steps of producing magnets with or without associated conductive elements.
Figure 23B:
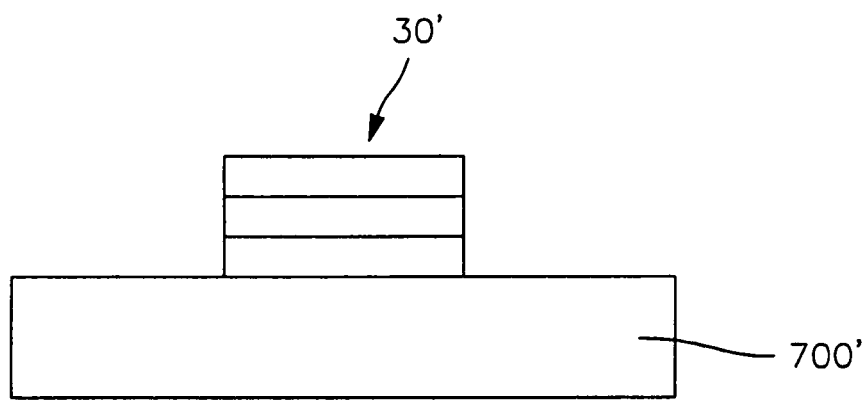
Figure 23C:
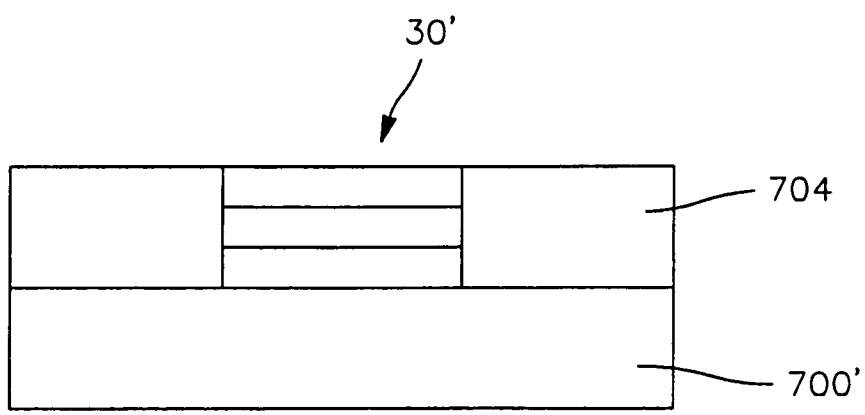

In the case of FIGS. 23A-23C, it is a question of producing a magnet the magnetization of which is not reversible. The example is taken of a magnet 30' as explained above in connection with FIG. 5B, however it could equally involve a stack of type 40' (FIG. 6B).

A stack of layers 701, 702, 703 is produced on a substrate 700', which will ultimately enable formation of the element having the desired magnetic properties. Examples of magnet compositions for the invention have already been provided above. Three layers are indicated here, however there could be any number of layers less or greater than 3. The substrate 700' can be homogeneous or heterogeneous, e.g., comprising a plurality of layers or having undergone deposition and/or etching operations.

The assembly of layers 701, 702, 703 is etched (see FIG. 23B) so as to give the magnet 30' the desired shape.

The magnet can next be coated with a coating material 704, e.g., silicon dioxide (see FIG. 23C).

Figure 24A:
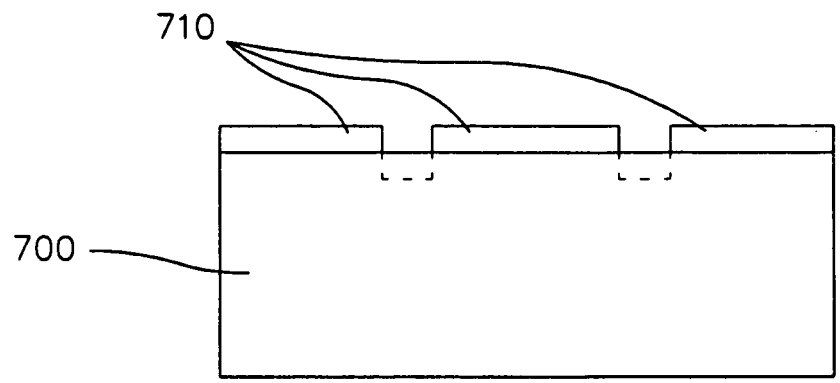
Figure 24B:
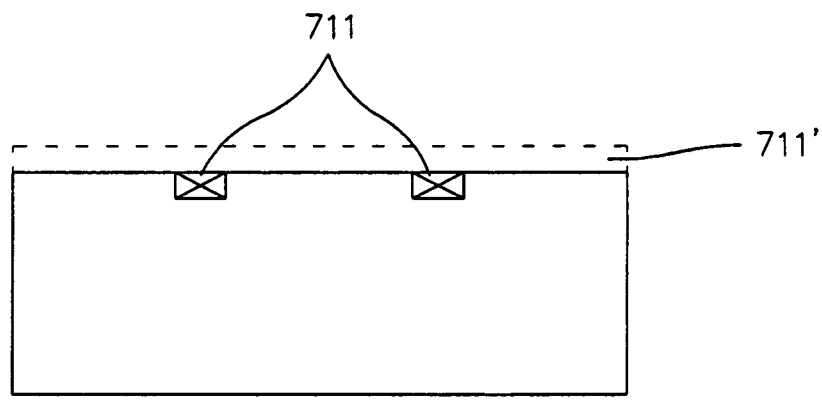
Figure 24C:
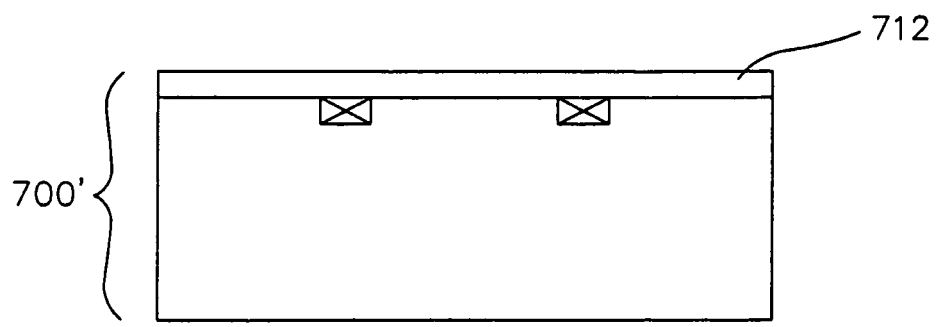

In the case where one or more conductive elements (such as elements 36, 36', 37 of FIGS. 5 or 6) should be formed, a series of preliminary steps can be implemented, such as those shown in FIGS. 24A-24C.

Starting with a substrate 700 made of silicon dioxide, for example, an etching step is carried out with a mask 710 (FIG. 24A). This step makes it possible to define regions in which the conductors will be made. A conductive material 711 is then deposited (FIG. 24B) in the etched regions. Optionally, a layer 711' of this material which the deposition operation may have deposited over the entire substrate can be removed by polishing. The resulting structure can next be coated with an insulating layer 712, e.g., a layer of silicon dioxide (see FIG. 24C). The example just given makes it possible to produce conductors 711 which are at the same depth in the substrate 700, however it is possible, via successive deposition and then etching steps, to produce conductors at different levels in the substrate 700. The substrate 700 can also be homogeneous or heterogeneous, e.g., comprising a plurality of layers or having undergone deposition and/or etching operations.

The resulting assembly comprises a substrate 700' on which the operations of FIGS. 23A-23C can next be carried out. A magnet 30, 40 will then be obtained of the type of FIG. 5A or 6A, respectively.

These methods of producing magnets will be capable of being used in the methods of producing a device according to the invention, which will now be described.

The example of the device of FIG. 7A will be considered first.

Starting with a substrate 520 (FIG. 19A) made of a material such as silicon dioxide SiO2 or else Si/SiO2 (layer of SiO2 on an Si substrate), a succession of layers 521, 522, 523 are deposited (FIG. 19B) on or in which magnets 30, 40 will be capable of being formed, e.g., according to one of the methods described with FIGS. 24A-25C. Layers 521, 522, 523, for example, are layers made of magnetic materials, which are then etched. The magnets produced can next be coated with a material such as silicon dioxide SiO2.

The conductive means 36 can likewise be produced over the course of these steps, also by layer etching and conductive material deposition.

The deposits are made by cathode sputtering, for example.

A sacrificial layer 430 (FIG. 19C) is next formed on this assembly, and then (FIG. 19D) a layer 500 of a material in which the beam 50 will be formed (e.g., a soft magnetic material). This layer is etched in order to give the beam 50 the desired shape and dimensions.

Next, the sacrificial layer 430 is removed by selective etching techniques, in order to release the beam 50. The final device of FIG. 7A is ultimately obtained. The base 51 is obtained by stopping the etching in time, which makes it possible to leave locations where the sacrificial layer is not removed. Alternatively, it is also possible to position the sacrificial layer beneath the beam in advance.

This method can be adapted to the production of any structure according to the invention. For example, for a structure such as the one in FIG. 8, the beam 50 will be formed by depositing layers of magnets, e.g., via cathode sputtering, onto the sacrificial layer 430 or advantageously onto a material forming the beam. As explained above, the latter is next removed, and then the base 51 is released.

For a structure such as the one in FIGS. 17A-18, an etching is further carried out which enables the pads 63, 65 to be formed. Or else, these pads are made in the same way as explained above for embedding a beam (etching in time or pre-positioning of the sacrificial layer).

Figure 20A:
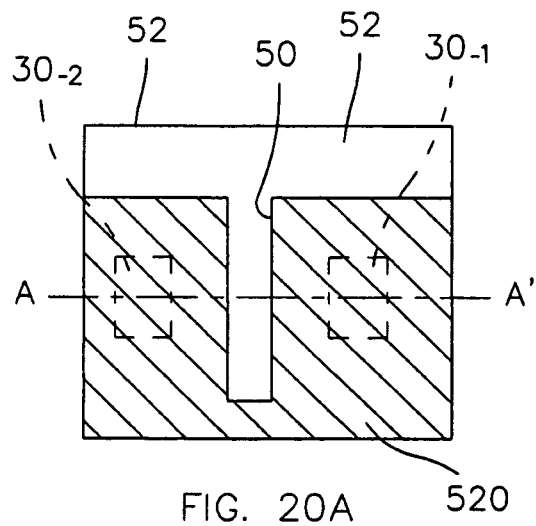
Figure 20B:
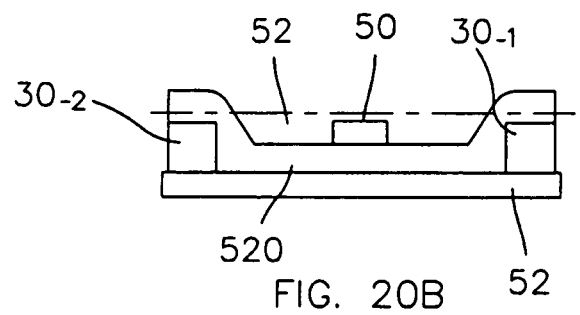

For a structure like that of FIGS. 10A-10D, a beam 50 is etched into a layer deposited on a sacrificial layer 520. This sacrificial layer was itself formed on a substrate 52 on which magnetic means 30-1, 30-2 were made previously (FIGS. 20A and 20B), this second figure being a sectional view along AA' of FIG. 20A, which is a top view). The sacrificial layer 520 can next be removed by etching, in order to release the beam 50 from the magnetic means. Said beam will thus move within the plane defined by the magnetic means.

Figure 20C:
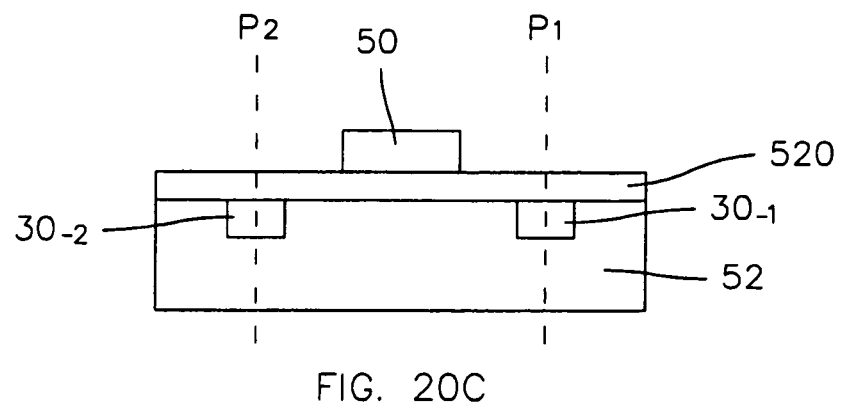

FIG. 20C is an alternative in which the magnetic means and the possible embedded conductors (not shown) are made in the substrate 52. A sacrificial layer 520 is then deposited on the structure thus obtained. The beam 50 is formed on this layer via deposition and etching. The sacrificial layer 520 can then be removed.

In both cases, the magnetic means can be formed as explained above in connection with FIGS. 23A-23C.

In this way, a device is obtained for which the movement of the beam 50 occurs within the plane of the magnetic means 30-1, 30-2 (FIG. 20B) or in a plane parallel to these magnetic means 30-1, 30-2 (FIG. 20C), according to the respective remanent magnetizations of the magnetic means 30-1, 30-2, which corresponds to the structure of FIGS. 10A-10D.

In one case (FIG. 20B) the two magnets are in the same plane as the movable element, and the movement of the latter occurs between these two magnets.

In the other case (FIG. 20C) two magnets are formed in the substrate. Then, over the course of the following steps, a movable element is formed in a plane parallel to that in which the magnets were formed, whereby the movement thereof will occur in the plane of the movable element, between two limit positions defined by planes P1, P2 perpendicular to the substrate 52 and passing through the magnets.

Devices having a planar structure are thus obtained.

The same techniques can be implemented to produce a planar structure such as the one in FIG. 11. The difference lies in the formation of the regions of magnetic material, however, the geometry of these regions is adapted in this regard in the method of FIGS. 23A-24C.

In all of the examples given above, one or several etch stop layers (not represented in the figures) can be laid in view of the etching of a layer laid down on this etch stop layer.

Yet another example of the method of producing a device according to the invention will be described in connection with FIGS. 21A-21I.

An etch stop layer 121, e.g., of SiN having a thickness of approximately 40 nm, is deposited (FIG. 21A) on a silicon substrate 120 (having a thickness of 500 μm, for example), and then a deposition of oxide 123 is made, e.g., having a thickness of 2 μm.

A lithography step is carried out, and then wet chemical etching of the oxide layer 123, stopping at the layer of SiN. Etched regions 230 are thereby produced in which deposits 124-1, 124-2, 124-3, 124-4 of AlSi can be made, e.g. via sputtering followed by mecanochemical polishing, stopping on the oxide layer 123 (FIG. 21B). The AlSi deposits 124-1, 124-3 form the metallic conductor for the heating line, and the AlSi deposits 124-2, 124-4 form the magnetic field-generating conductor. A new deposit 125 of silicon nitride is next made over the entire structure, e.g., having a thickness of 40 nm. This deposit 125 will form an insulation of the magnetic field-generating line with respect to the layer 126 of TiN. This therefore results in the structure of FIG. 21C.

Figure 21D:
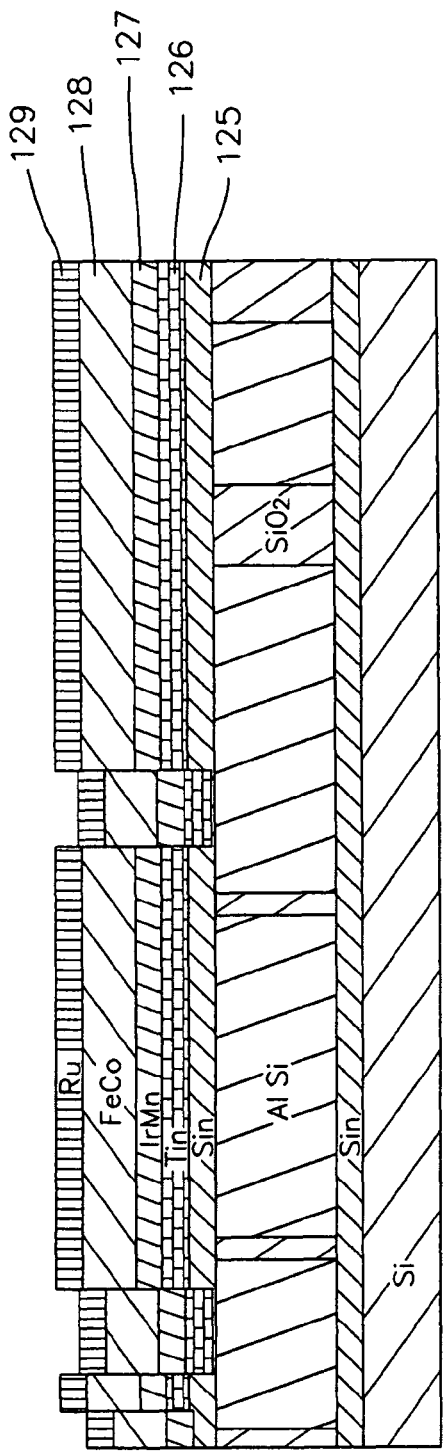
Figure 21E:
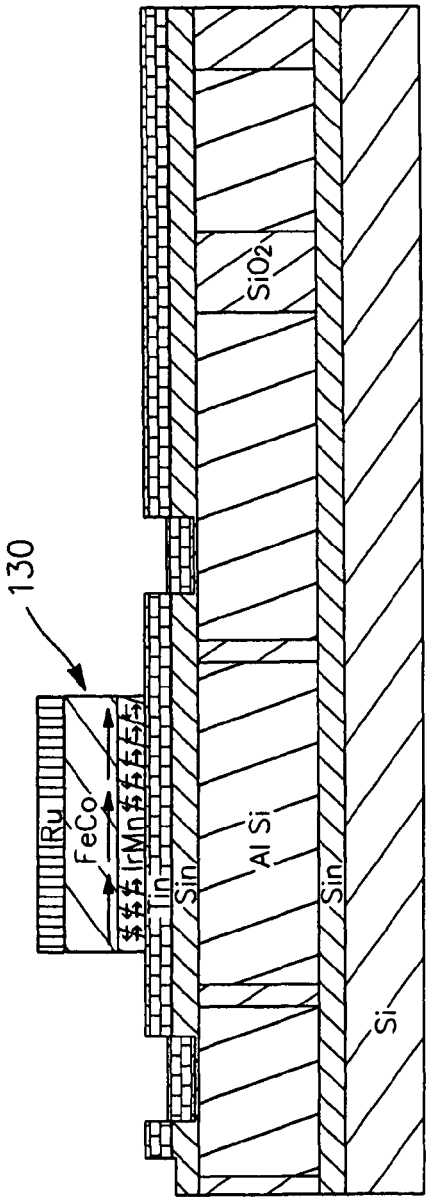

Layer 125 can next be etched and then coated with a layer 126 of titanium nitride TiN, upon which is deposited a stack comprising a layer of IrMn 127 (having a thickness of 50 nm, for example), a layer of FeCo 128 (having a thickness of 100 nm, for example) and a layer 129 of a material such as ruthenium (Ru) (having a thickness of 50 nm, for example) (FIG. 21D).

A magnet 130 is defined in the stack of layers 127-128-129 (FIG. 21E) by means of mask lithography.

Figure 21F:
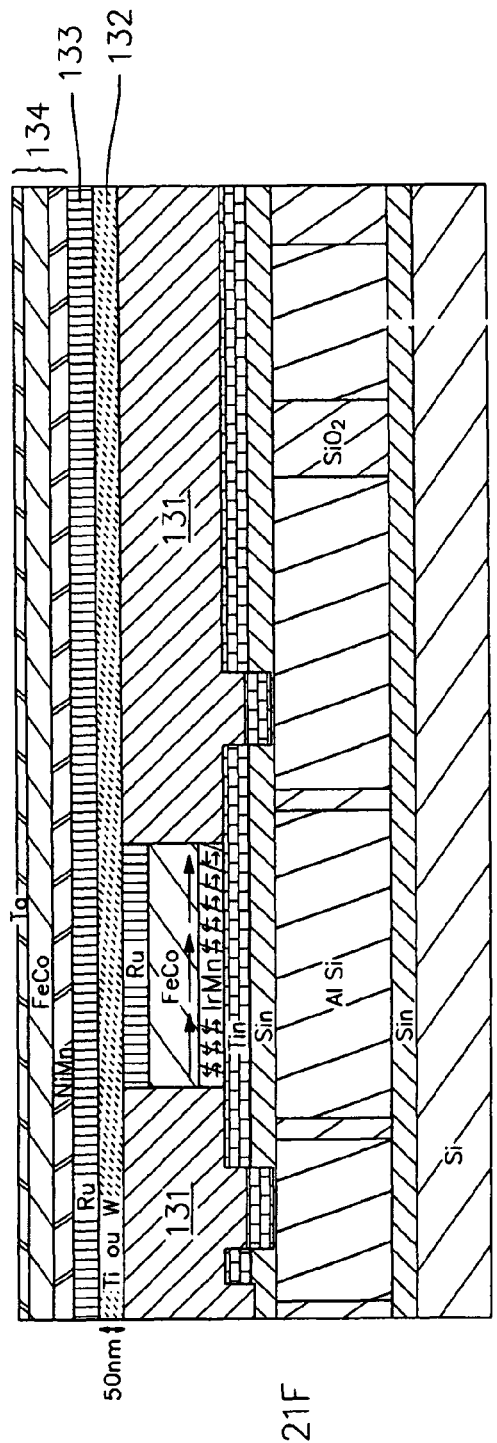

This magnet is next laterally encased in a layer of silicon dioxide SiO2 131, and then the assembly is coated with a layer 132 of titanium or tungsten, and then with a layer of ruthenium 133; a stack of layers 134 is then deposited on the latter, successively and in this order: NiMn, FeCo and Ta (FIG. 21F).

Figure 21G:
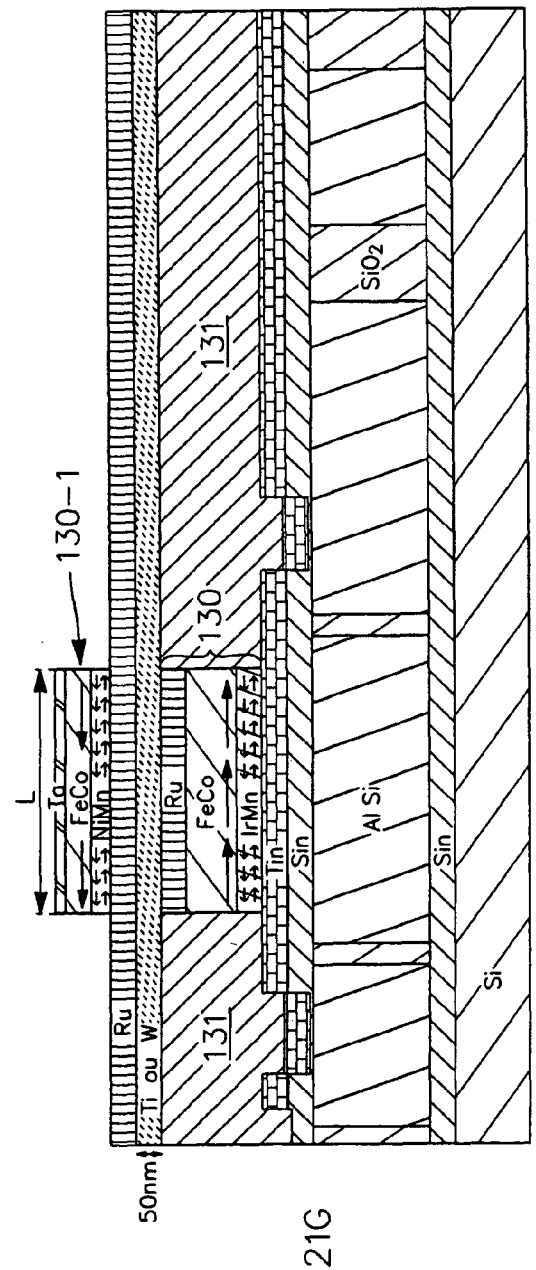
Figure 21H:
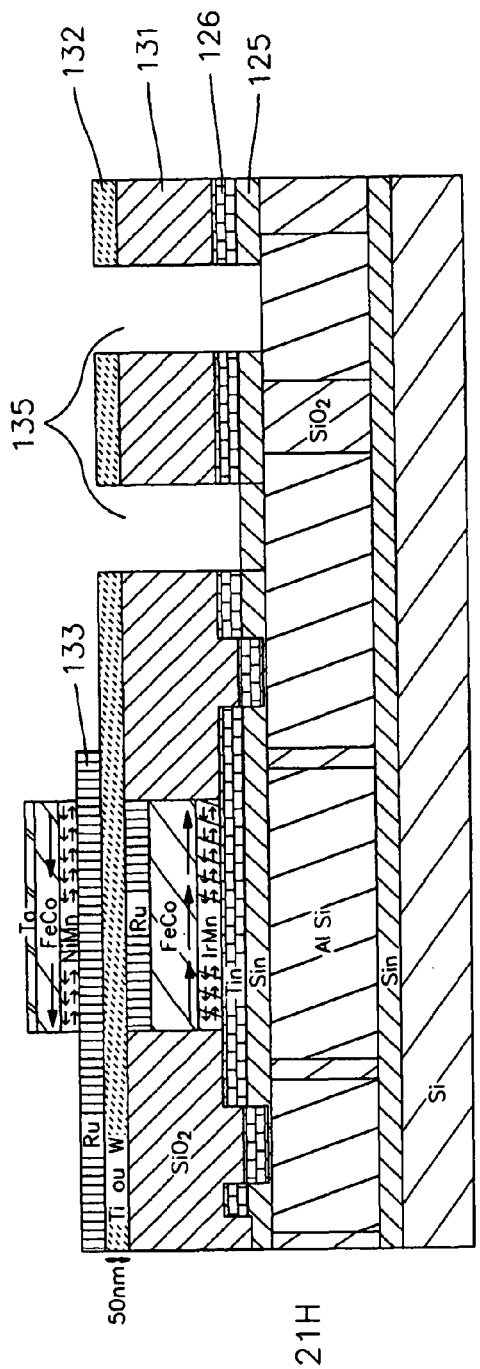
Figure 21I:
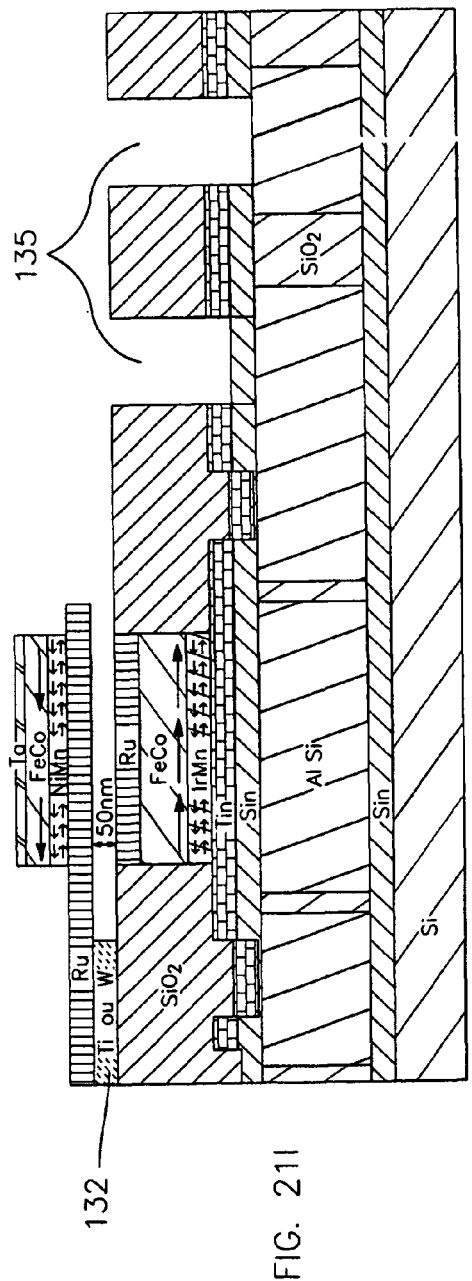

A second magnet 130-1 is defined in stack 134, via mask lithography (FIG. 21G). For example, it has a length L of substantially approximately 6 μm.

Finally, layer 133 is etched, which, for example, is made of ruthenium or platinum or aluminum (FIG. 21H), in order to obtain the desired shape for the movable element and the embedment thereof. It is next possible to etch cavities 135 into layers 131, 126, 125 while stopping the etching at material 124 (AlSi) (FIG. 21I) (in order to make contacts on this material), and to then release this layer 133 by etching layer 132. The gap is defined by the thickness of layer 132, which was removed in order to release layer 133. The structure ultimately obtained corresponds substantially to the one described above in connection with FIG. 9. The other embodiments can be obtained by applying the same deposition and etching techniques.

Among the possible applications of the invention, the following may be cited.

Mention can be made first of all to power switches for low-consumption circuits, which serve to reduce the consumption of the circuits by shutting off the input of the supply voltage and currents in order to eliminate leakage currents. For this technique, which is useful, in particular, for mobile applications, it is advantageous for the switches themselves to have a weak leakage current. Nanoswitches are therefore attractive candidates in comparison with conventional MOS switches.

Figure 22A:
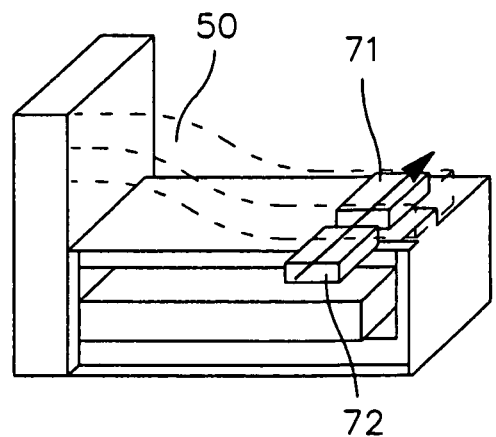
FIGS. 22A and 22B shown an exemplary application of a device according to the invention to a nanoswitch-type switch.
Figure 22B:
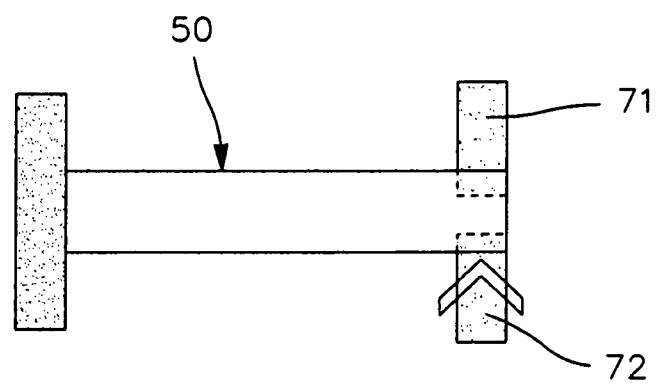

FIGS. 22A and 22B show a ¾ view and a top view, respectively, of a nanoswitch according to the invention, which is used as a series-configured switch: when it is in the ON position, it closes a current line 71, 72 which was open. It is the beam 50 which establishes the contact between portions of these two lines arranged on the substrate 52. It is likewise possible to use the nanoswitch in parallel configuration, by causing the signal to pass through the movable element.

DC-DC converters, which make it possible to convert the available energy of a given source into a form that can be used by the charge thereof, are another possible field of application of the invention. The operation of these converters is based on chopping up the energy of the source by means of switches. Here again, nanoswitches can advantageously replace MOS transistors, the sizes of which remain considerable (which are imposed by a compromise between the need to have a rather weak resistance in the conductive state and an equally weak equivalent capacitance).

The invention can likewise be advantageously applied to switched-capacitor circuits, which are an important category of analog-type signal-processing circuits. These circuits use switches which are integrated by the same technology as the capacitors, and which are currently produced with CMOS. However, certain phenomena, which are due to these CMOS, degrade the performance thereof, such as bandwidth reduction and distortion phenomena, problems which could be avoided by the use of nanoswitches according to the invention.

The invention likewise finds application in the field of analog integrated circuit testability, a testability which is dependent upon the number of inputs/outputs. This number has an influence on the cost associated with using the silicon surface, with packaging and with testing operations. When possible, and in order to reduce the number of inputs/outputs, multiplexing of analog input and output signals is used, by means of MOS communication ports. Here again, the use of nanoswitches is advantageous in terms of size and performance.

The invention can likewise be applied to nanomechanical memories in which an information bit is represented by the mechanical state of an element. The bistability property is then exploited, in order to represent a non-volatile 0 or 1, so as to retain the information without any energy input.

Finally, reference can be made to other fields of application, such as RF switches, or else any other system such as ON/OFF switches, or actuators for deformable membranes.

The invention claimed is:

1. Nanoswitch device comprising:
at least one stationary element and at least one movable element which is at least partially made of a magnetic material and which is movable with respect to the stationary element, from a first position to a second position and from said second position to said first position
said movable element being activated by:
at least one first magnet having a planar shape, defining a first plane, in order to generate remanent magnetization in a direction contained within said first plane or perpendicular to this first plane,
and at least one second magnet having a planar shape, defining a second plane, in order to generate remanent magnetization in a direction contained within said second plane or perpendicular to this second plane,
wherein the magnets are not in contact with each other, and at least one magnet comprises at least one antiferromagnetic material,
at least one conductor, disposed in the at least one stationary element under the at least one first and second magnets, for heating, by flowing of a current in the conductor, the at least one antiferromagnetic material above the blocking temperature of said at least one magnet in order to inverse the direction of the remanent magnetization of said at least one magnet, no current flowing through said at least one magnet, said magnets configured to exert a magnetic interaction on said at least one movable element to move it from said first position to said second position and said magnets configured to exert a magnetic interaction on said at least one movable element to move it from said second position to said first position.

2. Device of claim 1, the movable element being made of a soft magnetic material.

3. Device as claimed in claim 1, the first and second magnets being part of the stationary element.

4. Device of claim 3, the first magnet having remanent magnetic magnetization fixed in one direction contained in said first plane.

5. Device of claim 4, the second magnet having remanent magnetization capable of being reversed, in a direction contained in said second plane.

6. Device of claim 4, the second magnet having remanent magnetization capable of being reversed, in a direction perpendicular to said plane.

7. Device of claim 3, the second magnet having remanent magnetization fixed in a direction perpendicular to said plane.

8. Device of claim 7, the first magnet having variable remanent magnetization in a direction contained in said first plane.

9. Device of claim 8, comprising a plurality of second magnets having remanent magnetization fixed in a direction perpendicular to said first plane.

10. Device as claimed in claim 1, the movable element comprising the first magnet, the second magnet being part of the stationary element.

11. Device of claim 10, the first magnet having remanent magnetization fixed in a direction contained in said first plane.

12. Device as claimed in claim 10, the second magnet having variable remanent magnetization, in a direction perpendicular to said second plane.

13. Device as claimed in claim 10, the second magnet having variable remanent magnetization, in a direction contained in said second plane.

14. Device of claim 13, the first and second magnets being arranged in line with one another when the movable portion is in the position of rest.

15. Device as claimed in claim 10, comprising an axis of rotation about which a first portion and a second portion of the movable element are capable of pivoting, each portion of this movable element comprising at least one first magnet, the stationary element comprising at least one second magnet, each being arranged so as to cooperate with a first magnet of the movable element.

16. Device of claim 3, the movable portion being arranged in the same plane as the first and second magnets and being movable within this plane.

17. Device of claim 3, the movable portion being arranged and movable within a plane parallel to the plane defined by the first and second magnets.

18. Device as claimed in claim 16, the first and second magnets having remanent magnetization in a direction contained in the plane thereof, at least one of these magnetizations being variable.

19. Device as claimed in claim 1, at least one magnet having remanent magnetization perpendicular to the plane thereof comprising a stack of multilayer CoPt and at least one layer of an antiferromagnetic material.

20. Device as claimed in claim 1, at least one magnet having remanent magnetization in a direction contained in the plane thereof, or a magnet having planar magnetization, comprising at least one layer of a ferromagnetic material and at least one layer of an antiferromagnetic material.

21. Device of claim 20:
the antiferromagnetic material being of PtMn or NiMn composition, and the ferromagnetic material being of CoFe or NiFe composition,
or, the antiferromagnetic material being of IrMn or FeMn composition, and the ferromagnetic material being of NiFe or CoFe composition.

22. Device as claimed in claim 19, further comprising at least one conductor for:
heating the antiferromagnetic layer above the blocking temperature;
and for inducing a magnetic field for orienting the magnetization of the layer of ferromagnetic material or of the stack of multilayers CoPt,
to reverse the direction of the remanent magnetization of at least one of said first and second magnets.

23. Device of claim 22, comprising two conductive elements, one for heating the antiferromagnetic layer, the other for inducing a magnetic field for orienting magnetization.

24. Device as claimed in claim 22, further comprising a layer made of a material capable of releasing heat under the influence of an electrical current, which is arranged between the conductive element or elements and the antiferromagnetic layer.

25. Device as claimed in claim 22, the conductive element for heating the antiferromagnetic layer comprising a thermistor.

26. Device as claimed in claim 19, further comprising a thermal barrier for confining the heat in the magnet having planar magnetization and/or the magnet having perpendicular magnetization.

27. Device as claimed in claim 1, in which at least one of said first or second magnets includes a stack of layers.

28. Device of claim 27, the stack of layers comprising an alternation of at least one magnetic layer (F) and at least one antiferromagnetic layer (AF).

29. Device as claimed in claim 27, the stack being bounded by two external layers each of which is an antiferromagnetic layer.

30. Device as claimed in claim 1, at least one of said first and second magnets having reversible magnetization and being associated with means for reversing the magnetization.

31. Device as claimed in claim 1, wherein said at least one movable element is movable with respect to a stationary element from said first position to a third position and said magnets are configured to exert a magnetic interaction on said at least one movable element to move said at least one movable element from said first position to said third position.

* * * * *